US012524422B2

United States Patent
Farr et al.

(10) Patent No.: US 12,524,422 B2
(45) Date of Patent: Jan. 13, 2026

(54) SYSTEMS AND METHODS FOR PROCESSING HIERARCHICAL, SEMI-STRUCTURED, SCHEMA-LESS, POLYMORPHIC DATA

(71) Applicant: TDAA Technologies Corp, Colorado Springs, CO (US)

(72) Inventors: Jon Eric Farr, Colorado Springs, CO (US); Andrew McKennie Curran, Greenfield, MA (US)

(73) Assignee: TDAA Technologies Corp, Colorado Springs, CO (US)

( * ) Notice: Subject to any disclaimer, the term of this patent is extended or adjusted under 35 U.S.C. 154(b) by 0 days.

(21) Appl. No.: 19/187,811

(22) Filed: Apr. 23, 2025

(65) Prior Publication Data

US 2025/0335456 A1    Oct. 30, 2025

Related U.S. Application Data

(60) Provisional application No. 63/755,515, filed on Feb. 7, 2025, provisional application No. 63/638,093, filed on Apr. 24, 2024.

(51) Int. Cl.
*G06F 16/25* (2019.01)
*G06F 16/22* (2019.01)

(52) U.S. Cl.
CPC .......... *G06F 16/25* (2019.01); *G06F 16/2282* (2019.01)

(58) Field of Classification Search
CPC ...... G06F 16/289; G06F 16/258; G06F 16/25; G06F 16/2282
USPC ........................................................ 707/756
See application file for complete search history.

(56) References Cited

U.S. PATENT DOCUMENTS

| 6,292,810 B1* | 9/2001 | Richards | G06F 40/18 715/810 |
| 6,502,213 B1* | 12/2002 | Bowman-Amuah | G06F 9/4812 710/266 |
| 2015/0199378 A1* | 7/2015 | Reyntjens | G06N 5/00 707/754 |

OTHER PUBLICATIONS

International Search Report and Written Opinion, mailed Jun. 12, 2025 for International Application No. PCT/US2025/025927.

* cited by examiner

*Primary Examiner* — Hung T Vy
(74) *Attorney, Agent, or Firm* — Wolf, Greenfield & Sacks, P.C.

(57) ABSTRACT

Provided are systems and methods to transform a specified source dataset into a fully defined data format that details every attribute value in all levels for each document or record in the source dataset. According to various embodiments, the systems and methods are configured to execute recursive analysis on a specified data source, build out a fully specified data format and associated meta-data, enable user adjustments to a fully schema, and trigger automatic generation of code to transform the source to the new destination format even in the presence of polymorphic data. The process to scan source data involves recursively evaluating every attribute value in all levels for each document or record in the source dataset to account for any polymorphic data. The scan determines each attribute's data type usage, datetime formats and can interrogate string data to identify objects within string data.

21 Claims, 32 Drawing Sheets

```
[ ]JSON_DATA
{
    "_id" : "re-8594abcd-3217-4889-ef01-23b45cd6789f",
    "address" : "123 Main St",
    "amenities" : [
        "Gym",
        "Rooftop Deck",
        {
            "availability" : "Reservable",
            "capacity" : 20,
            "name" : "Conference Rooms"
        }
    ],
    "maintenance_log" : [
        {
            "action" : "Repainted walls",
            "area" : "Lobby",
            "cost" : 1500,
            "date" : "20210510"
        },
        {
            "action" : "Installed new security cameras",
            "area" : "Parking Garage",
            "contractor" : "SecureWatch Solutions",
            "cost" : 7500,
            "date" : "20220202"
        }
    ],
    "owner": {
```

Output Object Settings

Output Object Type*
Dynamic Table

Root Output Object Select Prefix

Output Object Prefix Name*
raw_realestate

Output Object Deployment Database Name
DEMO_DATA

Output Object Deployment Schema Name
SAMPLE_DATA

☐ Include Stream Message Metadata
☑ Use Case Sensitivity

FIG. 8

Dynamic Table Settings

Dynamic Table Warehouse Name*
DATAPANCAKE_X_SMALL_01

Dynamic Table Target Lag Unit Type*
hours

Dynamic Table Target Lag Quantity*
1

Root Dynamic Table Optional Parameters
REFRESH_MODE=INCREMENTAL

Nested Dynamic Table Optional Parameters
REFRESH_MODE=INCREMENTAL

Dynamic Table Metadata Settings

☑ Create Metadata for Dynamic Table Inserts
☑ Create Metadata for Dynamic Table Updates
☑ Create Metadata for Dynamic Table Deletes Task Deployment Database Name Task Deployment Schema Name Metadata Table Task Warehouse Name**
DATAPANCAKE_X_SMALL_01

Metadata Table Task Cron Schedule**
0 3 * * *

Metadata Table Task Schedule Time Zone**
America/Denver

Cron Schedule Examples

FIG. 9

Schema Consolidation ⓘ

**Click the + symbol in the bottom row to add a new schema consolidation. To delete a row move your mouse to the leftmost column in the table to reveal a checkbox, check the box, and press the delete key.

| Name | Search RegEx | Replace RegEx |
|---|---|---|
|  |  |  |
|  |  |  |
|  |  |  |

[ Save Schema Consolidations ]

Schema Filters ⓘ

**Click the + symbol in the bottom row to add a new schema filter. To delete a row move your mouse to the leftmost column in the table to reveal a checkbox, check the box, and press the delete key.

| Name | Filter RegEx |
|---|---|
|  |  |
|  |  |
|  |  |

FIG. 11

Data Source Settings

Record Limit

150  − +

Where Clause

Warehouse Settings

Virtual Warehouse*

DATAPANCAKE_X_SMALL_01  >

FIG. 13

Vertical Scale Settings

Number of Threads*

8  − +

Number of Procedure Calls*

1  − +

Record Count Per Procedure Call*

0  − +

Order By**

Save

Source Stream Settings

Last Scanned Timestamp

FIG. 14

Attributes

Select a data source

[DATAPANCAKE.SAMPLE_DATA.REALESTATE_JSON ▼]

Source Attributes: Type Inference · Transformation · Schema Consolidation · Semantic Layer · Security Policy

| Path | Name | Polymorphic Name | Alias | Primary Key | Unique | Contains Enum Values | Level | Data Type | Has Stringified JS |
|------|------|------------------|-------|-------------|--------|---------------------|-------|-----------|--------------------|
| id | id | id_str | None | ☑ | ☐ | ☐ | 1 | str | ☐ |
| address | address | address_array_object | None | ☐ | ☐ | ☐ | 1 | array | ☐ |
| address[i] | address | address_str | None | ☐ | ☐ | ☐ | 1 | str | ☐ |
| address[i] | address | address_object | None | ☐ | ☐ | ☐ | 2 | object | ☐ |
| address[i].city | city | city_str | None | ☐ | ☐ | ☐ | 3 | str | ☐ |
| address[i].state | state | state_str | None | ☐ | ☐ | ☐ | 3 | str | ☐ |
| address[i].street | street | street_str | None | ☐ | ☐ | ☐ | 3 | str | ☐ |
| address[i].zip_code | zip_code | zip_code_str | None | ☐ | ☐ | ☐ | 3 | str | ☐ |
| amenities | amenities | amenities_array_primitive | None | ☐ | ☐ | ☐ | 1 | array | ☐ |
| amenities | amenities | amenities_array_object | None | ☐ | ☐ | ☐ | 1 | array | ☐ |

FIG. 16

Source Attributes  Type Inference  Transformation  Schema Consolidation  Semantic Layer - Security Policy

| Unique | Contains Enum Values | Level | Data Type | Has Stringified JSON | Attribute Type | Attribute Status* | Sample Value | Array Type | Array Prim Data Type | Foreign Keys | Date Active | Schema Component Type |
|---|---|---|---|---|---|---|---|---|---|---|---|---|
| ○ | ○ | 1 | str | ○ | Discovered | active | string value | None | None | None | 02/27/2025 05:15 | None |
| ○ | ○ | 1 | array | ○ | Discovered | active | None | object | None | property_id_str as property_id_ | 02/27/2025 05:15 | None |
| ○ | ○ | 1 | str | ○ | Discovered | active | string value | None | None | None | 02/27/2025 05:15 | None |
| ○ | ○ | 2 | object | ○ | Discovered | active | None | None | None | None | 02/27/2025 05:15 | None |
| ○ | ○ | 3 | str | ○ | Discovered | active | string value | None | None | None | 02/27/2025 05:15 | None |
| ○ | ○ | 3 | str | ○ | Discovered | active | string value | None | None | None | 02/27/2025 05:15 | None |
| ○ | ○ | 3 | str | ○ | Discovered | active | string value | None | None | None | 02/27/2025 05:15 | None |
| ○ | ○ | 3 | str | ○ | Discovered | active | string value | None | None | None | 02/27/2025 05:15 | None |
| ○ | ○ | 1 | array | ○ | Discovered | active | string value | primitive | str | None | 02/27/2025 05:15 | None |
| ○ | ○ | 1 | array | ○ | Discovered | active | None | object | None | None | 02/27/2025 05:15 | None |

Source Attributes  Type Inference  Transformation  Schema Consolidation  Semantic Layer - Security Policy

| Path: | Polymorphic Name | Data Type | Snowflake Data Type* | Sample Value | Use Datetime Format* | DateTime Format** | Precision** | Scale** |
|---|---|---|---|---|---|---|---|---|
| _id | id_str | str | VARCHAR | string value | ○ | None | None | None |
| address | address_array_object | array | ARRAY | None | ○ | None | None | None |
| address | address_str | str | VARCHAR | string value | ○ | None | None | None |
| address[0] | address_object | object | OBJECT | None | ○ | None | None | None |
| address[0].city | city_str | str | VARCHAR | string value | ○ | None | None | None |
| address[0].state | state_str | str | VARCHAR | string value | ○ | None | None | None |
| address[0].street | street_str | str | VARCHAR | string value | ○ | None | None | None |
| address[0].zip_code | zip_code_str | str | VARCHAR | string value | ○ | None | None | None |
| amenities | amenities_array_primitive | array | | | ○ | None | None | None |
| amenities | amenities_array_object | array | ARRAY | None | ○ | None | None | None |

Save Attributes

FIG. 19

Source Attributes  Type Inference  Transformation  Schema Consolidation  Semantic Layer - Security Policy

| Path | Polymorphic Name | Data Type | Snowflake Data Type* | Null Value Expression** | Transformation Type** | Transformation Expression** |
|---|---|---|---|---|---|---|
| _id | _id_str | str | VARCHAR | NULL | SQL Expression | any valid sql expression |
| address | address_array_object | array | ARRAY | NULL | No Transformation | None |
| address | address_str | str | VARCHAR | NULL | No Transformation | None |
| address[0] | address_object | object | OBJECT | NULL | No Transformation | None |
| address[0].city | city_str | str | VARCHAR | NULL | No Transformation | None |
| address[0].state | state_str | str | VARCHAR | NULL | No Transformation | None |
| address[0].street | street_str | str | VARCHAR | NULL | No Transformation | None |
| address[0].zip_code | zip_code_str | str | VARCHAR | NULL | No Transformation | None |
| amenities | amenities_array_primitive | array | | | | |
| amenities | amenities_array_object | array | ARRAY | NULL | No Transformation | None |

Save Attributes

FIG. 20

Source Attributes  Type Inference  Transformation  Schema Consolidation  Semantic Layer - Security Policy

| Path | Name | Polymorphic Name | Consolidation Search | Consolidation SQL Expression |
|---|---|---|---|---|
| _id | _id | _id_str | None | None |
| address | address | address_array_object | None | None |
| address | address | address_str | None | None |
| address[0] | address | address_object | None | None |
| address[0].city | city | city_str | None | None |
| address[0].state | state | state_str | None | None |
| address[0].street | street | street_str | None | None |
| address[0].zip_code | zip_code | zip_code_str | None | None |
| amenities | amenities | amenities_array_primitive | None | None |
| amenities | amenities | amenities_array_object | None | None |

Save Attributes

FIG. 21

Source Attributes   Type Inference   Transformation   Schema Consolidation   Semantic Layer - Security Policy

| Path | Name | Polymorphic Name | Add to Row Access Policy | Masking Policy Name | Masking Policy Parameters | Sample Value | Include in Semantic Layer |
|---|---|---|---|---|---|---|---|
| _id | _id | _id_str | ☐ | None | None | string value | ☑ |
| address | address | address_array_object | ☐ | None | None | None | ☑ |
| address | address | address_str | ☐ | None | None | string value | ☑ |
| address[0] | address | address_object | ☐ | None | None | None | ☑ |
| address[0].city | city | city_str | ☐ | None | None | string value | ☑ |
| address[0].state | state | state_str | ☐ | None | None | string value | ☑ |
| address[0].street | street | street_str | ☐ | None | None | string value | ☑ |
| address[0].zip_code | zip_code | zip_code_str | ☐ | None | None | string value | ☑ |
| amenities | amenities | amenities_array_primitive | ☐ | None | None | string value | ☑ |
| amenities | amenities | amenities_array_object | ☐ | None | None | None | ☑ |

Merge Numeric Attributes

Save Attributes

FIG. 22

Source Attributes  Type Inference  Transformation  Schema Consolidation  Semantic Layer - Security Policy

| Name | Polymorphic Name | Add to Row Access Policy | Masking Policy Name | Masking Policy Parameters | Sample Value | Include in Semantic Layer | SQL Expression | Semantic Layer Alias |
|---|---|---|---|---|---|---|---|---|
| _id | _id_str | ☐ | None | None | string value | ☑ | None | None |
| address | address_array_object | ☐ | None | None | None | ☑ | None | None |
| address | address_str | ☐ | None | None | string value | ☑ | None | None |
| address[0] | address_object | ☐ | None | None | None | ☐ | None | None |
| city | city_str | ☐ | None | None | string value | ☑ | None | None |
| state | state_str | ☐ | None | None | string value | ☑ | None | None |
| street | street_str | ☐ | None | None | string value | ☑ | None | None |
| zip_code | zip_code_str | ☐ | None | None | string value | ☑ | None | None |
| amenities | amenities_array_primitive | ☐ | None | None | None | ☑ | None | None |
| amenities | amenities_array_object | ☐ | None | None | None | ☑ | None | None |

FIG. 23

Arrays

| Path | Polymorphic Name | Include in Code Gen | Dynamic Table Alias Name | Semantic Layer Alias Name | Semantic Layer Row Access Policy | Relationship Name |
|---|---|---|---|---|---|---|
| address | address_array_object | ☑ | None | None | None | property addresses |
| amenities | amenities_array_primitive | ☑ | None | None | None | None |
| amenities | amenities_array_object | ☑ | None | None | None | None |
| maintenance_log | maintenance_log_array_object | ☑ | None | None | None | None |
| property_management.notes | notes_array_primitive | ☑ | None | None | None | None |
| property_management.notes | notes_array_object | ☑ | None | None | None | None |

FIG. 24

Arrays

| ic Name | Include in Code Gen | Dynamic Table Alias Name | Semantic Layer Alias Name | Semantic Layer Row Access Policy | Relationship Name | Description | Relationship Type | Join Type |
|---|---|---|---|---|---|---|---|---|
| array_object | ☑ | None | None | | property addresses | None | many_to_one | inner |
| s_array_primitive | ☑ | None | None | | None | None | None | None |
| s_array_object | ☑ | None | None | | None | None | None | None |
| nce_log_array_object | ☑ | None | None | | None | None | None | None |
| ay_primitive | ☑ | None | None | | None | None | None | None |
| ay_object | | | | | | | | |

FIG. 25

Array Foreign Keys
Select an array attribute to edit foreign keys

| address - object | ⌄ |
|---|---|

---

**Click the + symbol in the bottom row to add a new array foreign key. To delete a row move your mouse to the leftmost column in the table to reveal a checkbox, check the box, and press the delete key.

| ≡ Parent Attribute Name | ≡ Foreign Key Column Alias | ≡ Add to Row Access Policy |
|---|---|---|
| property_id_str | property_id_fk | |
| | | |
| | | |
| | | |
| | | |

Save Foreign Keys

```sql
CREATE OR REPLACE View DEMO_DATA.SAMPLE_DATA.vw_realestate
--Column masking policies not configured
--Row access policy not configured
--Optional parameters not configured
    AS
    SELECT
        raw_data."_id_str",
        "address_array",
        "address_str",
        "amenities_array",
        "maintenance_log_array",
        "owner_contact_email_str",
        "owner_contact_name_str",
        "owner_contact_phone_str",
        "owner_name_str",
        "owner_ownerships_percentage_owned_int",
        raw_data."property_id_str",
        "property_management_company_name_str",
        "property_management_contact_email_str",
        "property_management_contact_name_str",
        "property_management_contact_phone_str",
        "property_management_notes_array",
        "property_management_services_offered_array",
        "property_type_sq_ft_int",
        "property_type_str",
        "property_type_usage_str",
        "units_array",
        metadata.CREATED_AT,
        metadata.LAST_UPDATED_AT,
        metadata.LAST_ACTION,
        metadata.UNIQUE_ID
    FROM
        DEMO_DATA.SAMPLE_DATA.raw_realestate raw_data
    LEFT OUTER JOIN DEMO_DATA.SAMPLE_DATA.RAW_REALESTATE_METADATA metadata
        ON raw_data."_id_str" = metadata."id_str" and raw_data."property_id_str" = metadata."property_id_str";
```

FIG. 28

| A_id_str | [ ] address_array | A_address_s | [ ] amenities_array |
|---|---|---|---|
| 1 re-8594abcd-3217-4889-ef01-23b45cd6789f | null | 123 Main St | ["Gym", "Rooftop Deck", {"availability": |
| 2 re-8594abcd-3217-4889-ef01-23b45cd6789f | null | 123 Main St | ["Gym", "Rooftop Deck", {"availability": |
| 3 re-8594efgh-3217-4889-ef01-23b45cd6789f | [{ "city": "Skyline", "state": "NY" | null | ["Gym", "Rooftop Deck", {"availability": |
| 4 re-8594efgh-3217-4889-ef01-23b45cd6789f | [{ "city": "Skyline", "state": "NY" | null | ["Gym", "Rooftop Deck", {"availability": |

| [ ] maintenance_log_array | A_owner_contact_email_str | A_ow |
|---|---|---|
| [{ "action": "Repainted walls", "area": "Lobb | alicia@downtownrealty.com | Alicia N |
| [{ "action": "Repainted walls", "area": "Lobb | alicia@downtownrealty.com | Alicia N |
| [{ "action": "Repainted walls", "area": "Lobb | alicia@downtownrealty.com | Alicia N |
| [{ "action": "Repainted walls", "area": "Lobb | alicia@downtownrealty.com | Alicia N |

FIG. 29

```
{
    "_id": "re-8594abcd-3217-4889-ef01-23b45cd6789f",
    "property_id": "PR-5689",
    "property_type": "Mixed-use",
    "address": "123 Main St",
    "owner": {
        "name": "Downtown Realty LLC",
        "contact": {
            "name": "Alicia Martinez",
            "phone": "+1-567-890-1234",
            "email": "alicia@downtownrealty.com"
        },
        "ownerships": {
            "percentage_owned": 100,
            "partners": ["partner1"]
        }
    },
    "units": [
        {
            "unit_id": "U1001",
            "unit_type": "Commercial",
            "sqft": 2500,
```

```
            "amenities": [
                "Gym",
                "Rooftop Deck",
                {
                    "name": "Conference Rooms",
                    "availability": "Reservable",
                    "capacity": 20
                }
            ],
            "maintenance_log": [
                {
                    "date": "20210510",
                    "area": "Lobby",
                    "action": "Repainted walls",
                    "cost": 1500.00
                }
            ],
```

```
            "_id": "re-8594efgh-3217-4889-ef01-23b45cd6789f",
            "property_id": "PR-5690",
            "property_type": {"usage": "Commerical", "sq_ft": 20000},
            "address": [{
                "street": "1234 High Tower Rd",
                "city": "Skyline",
                "state": "NY",
                "zip_code": "10101"
            }],
            "owner": {
                "name": "Downtown Realty LLC",
                "contact": {
                    "name": "Alicia Martinez",
                    "phone": "+1-567-890-1234",
                    "email": "alicia@downtownrealty.com"
                },
                "ownerships": {
                    "percentage_owned": 100,
                    "partners": []
                }
```

FIG. 30

- TDAA_SAMPLE_DATA
  - DOMAIN_JSON_DATA
    - Tables
    - Dynamic Tables
      - raw_realestate
      - raw_realestate_address_array_object
      - raw_realestate_amenities_array_object
      - raw_realestate_amenities_array_primitive
      - raw_realestate_maintenance_log_array_object
      - raw_realestate_owner_object_ownerships_object_partners_array_primitive
      - raw_realestate_property_management_object_notes_array_object
      - raw_realestate_property_management_object_notes_array_primitive
      - raw_realestate_property_management_object_services_offered_array_primitive
      - raw_realestate_units_array_object
      - raw_realestate_units_array_object_tenants_array_object
      - raw_realestate_units_array_object_tenants_array_object_contacts_array_object
      - raw_realestate_units_array_object_tenants_array_object_lease_object_maintenance_array_object
      - raw_realestate_units_array_object_tenants_array_object_lease_object_maintenance_requests_array_object
      - raw_realestate_units_array_object_tenants_array_object_lease_object_renewal_options_array_object
      - raw_realestate_units_array_object_tenants_array_object_profile_object_credit_check_object_notes_array_primitive
      - raw_realestate_units_array_object_tenants_array_object_profile_object_references_array_object
      - raw_realestate_units_array_object_utilities_object_internet_service_array_object

FIG. 32

SYSTEMS AND METHODS FOR PROCESSING HIERARCHICAL, SEMI-STRUCTURED, SCHEMA-LESS, POLYMORPHIC DATA

RELATED APPLICATIONS

This application claims priority under 35 U.S.C. § 119 (c) to U.S. Provisional Application Ser. No. 63/638,093, entitled "SYSTEMS AND METHODS FOR PROCESSING HIERARCHICAL, SEMI-STRUCTURED, SCHEMA-LESS, POLYMORPHIC DATA," filed on Apr. 24, 2024. This application claims priority under 35 U.S.C. § 119 (c) to U.S. Provisional Application Ser. No. 63/755,515, entitled "SYSTEMS AND METHODS FOR PROCESSING HIERARCHICAL, SEMI-STRUCTURED, SCHEMA-LESS, POLYMORPHIC DATA," filed on Feb. 7, 2025. Each of which is herein incorporated by reference in their entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Hierarchical data, in its various formats such as JSON, are used for storing and transferring information between systems. The flexibility of these formats makes them useful, but also result in known problems with processing this type of data due to the format's schema-less structure. Various unstructured or semi-structured formats exist. Using JSON as an example, each attribute in a JSON object can store several different types of data including primitive data types as well as nested objects or even different types of arrays. Processing this data is time consuming and error-prone because there is often a need for the schema, that must be discovered and because the schema can continue to evolve the definition of a schema is almost never complete. Each time the schema evolves additional engineering work is required to process the new schema. If the schema is not discovered correctly, data loss can occur leading to degraded data quality. Additionally, there can be multiple levels of nested structures (e.g. documents or arrays, among other options) in this type of data. These nested structures can be similar to child tables in a relational database. This presents an additional significant and ubiquitous challenge to processing hierarchical data: the lack of an efficient method for flattening out these arrays to make them usable in reporting and analytics.

SUMMARY

The inventors have realized there is a much more efficient and accurate way to process this complex data and create a fully defined data format (e.g., structured data (e.g., relational tables)) for any source data. Various embodiments are configured to generate and accurately represent the full schema of a dynamic data source (e.g., a hierarchical data source, among other options). Many existing solutions attempt to extract and flatten the hierarchical data with a single pass without taking into account the potential polymorphic nature of the data. The inventors have realized that a data source (format agnostic) and destination data (format agnostic) solution is needed. Various embodiments use a combination of automated processes and human interaction that provides for a much more robust, efficient, and accurate representation of source data. In some examples, the output includes hierarchical data and results in a relational format resolving a host of technical issues with managing any source data. And for example, makes it much easier for engineers, analysts, and systems to consume the newly transformed data. The improvements in processing, accuracy, and capability over conventional implementation extends even into other systems to provide further refinement or enrichment to the newly transformed data. Various aspects of this approach utilize sophisticated processes to deeply and recursively scan a source dataset to discover the full definition/schema used across all source (e.g., hierarchical, semi-structured, unstructured, etc.) data records and produce metadata for each attribute and each data type ever used for a particular attribute/record. This recursive and complete scan of the source data yields a fully defined format and enables transformation of any source data.

In some embodiments, once this scanning and discovery process has been completed, a user is presented with the generated metadata and allowed to configure or modify parts of the metadata based on their particular requirements. The system can present potential mappings between a source and the recursively enumerated meta-data and a destination data format. Once the user has completed the configuration of the metadata for a source dataset and a target destination data source the process can continue by automatically generating the code necessary for the destination data target to extract and flatten the source dataset into multiple relational tables or data streams depending on the destination data target's technology. In some examples, the approach provides new functionality in that the metadata generated can support each attribute with respective meta-attributes storing multiple types of data. As an example, if the source dataset contains an attribute that has used multiple data types such as a string, an object, and an object array, then the generated code is configured to generate a single attribute into multiple output columns for the string and/or the object and then create a new relational table or stream for the object array.

Still other aspects, embodiments, and advantages of these exemplary aspects and embodiments, are discussed in detail below. Any embodiment disclosed herein may be combined with any other embodiment in any manner consistent with at least one of the objects, aims, and needs disclosed herein, and references to "an embodiment," "some embodiments," "an alternate embodiment," "various embodiments," "one embodiment" or the like are not necessarily mutually exclusive and are intended to indicate that a particular feature, structure, or characteristic described in connection with the embodiment may be included in at least one embodiment. The appearances of such terms herein are not necessarily all referring to the same embodiment. The accompanying drawings are included to provide illustration and a further understanding of the various aspects and embodiments, and are incorporated in and constitute a part of this specification. The drawings, together with the remainder of the specification, serve to explain principles and operations of the described and claimed aspects and embodiments.

BRIEF DESCRIPTION OF THE DRAWINGS

Various aspects of at least one embodiment are discussed herein with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. Where technical features in the figures, detailed description or any claim are followed by references signs, the reference signs have been included for the sole purpose of increasing the intelligibility of the figures, detailed description, and/or claims. Accordingly, neither the reference signs nor their absence are intended to have any limiting effect on the scope of any claim elements. In the figures, each identical or nearly identical component that is illustrated in various figures is represented by a like numeral. For purposes of clarity, not every component may be labeled in every figure. In the figures:

FIG. 5 is an example screen capture of a user interface, according to one embodiment;

FIGS. 6-27 show example screen captures of a user interface according to some embodiments;

FIG. 28 is an example of view generation/replacement, according to one embodiment;

FIG. 29 is an example of transformed data, according to one embodiment;

FIGS. 30-31 show example data, according to one embodiment; and

FIG. 32 shows an example of a discovered schema with polymorphic versions, according to one embodiment.

DETAILED DESCRIPTION

Figure 1:
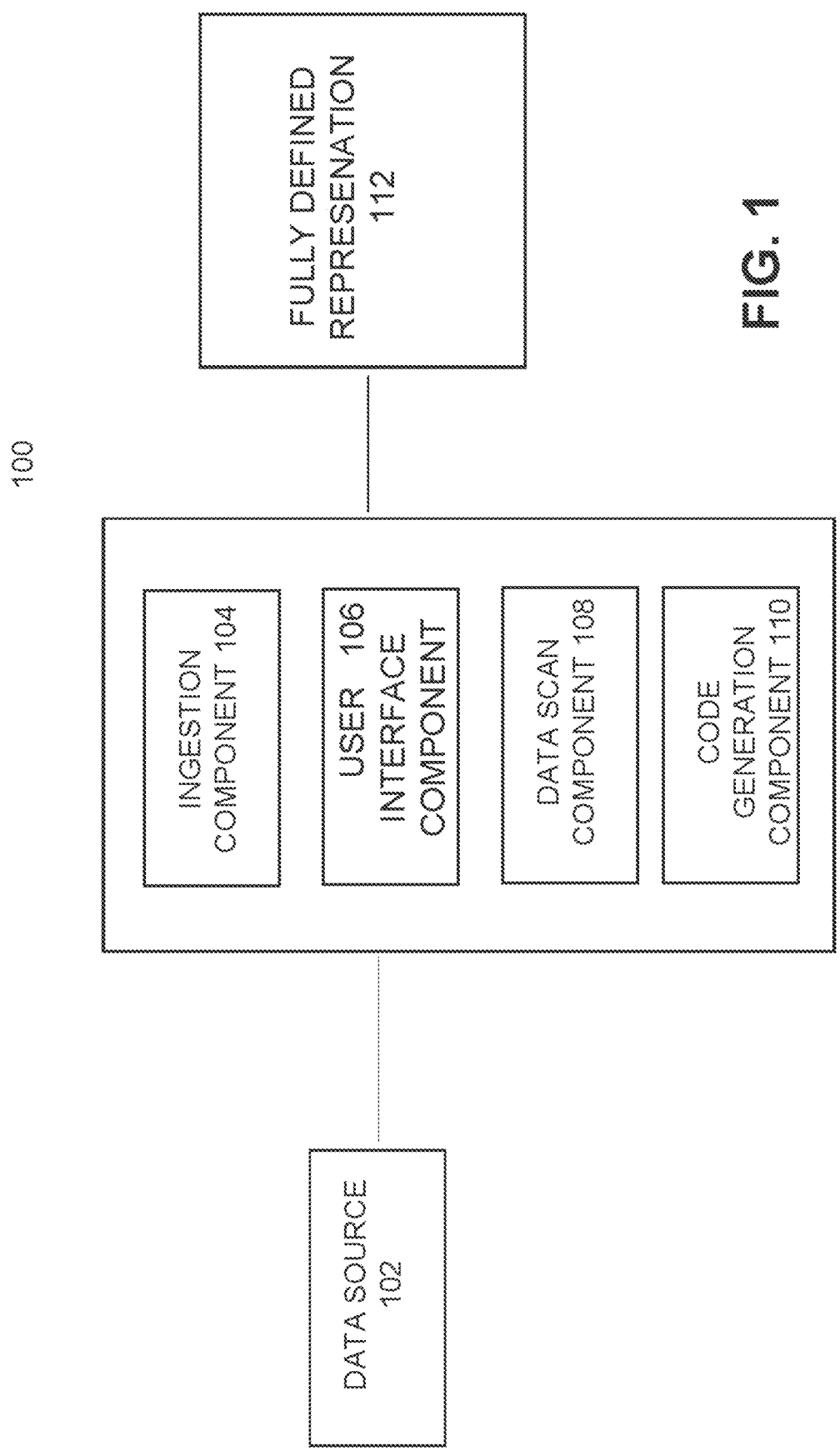
FIG. 1 is a block diagram of an example system, according to one embodiment.

According to one aspect, provided are systems and methods to transform a specified source dataset into a fully defined data format that details every attribute value in all levels for each document or record in the source dataset. According to various embodiments, the systems and methods are configured to execute recursive analysis on a specified data source, build out a fully specified data format and associated meta-data, enable user adjustments to a fully defined schema, and trigger automatic generation of code to transform the source to the new destination format. According to some embodiments, the sophisticated process to scan source data involves recursively evaluating every attribute value in all levels for each document or record in the source dataset to determine each attribute's data type usage, datetime formats for string values that can be interpreted as date, time, or datetime, and the largest size of precision and scale used for attributes that store numeric data types.

In further examples, part of the metadata generated is a mapping of the source data type to a destination such as a Snowflake data warehouse. For example, Snowflake has specific data types that the data warehouse supports that are different from the data types supported by JSON to provide an example. The process is configured to infer the correct destination data type based on the schema and data evaluation-which can vary based on specification of source dataset and/or specification of a destination for the transformed data. According to some embodiments, after the metadata has been generated, the user has the flexibility to further configure the metadata prior to code generation to modify the destination data type. As an example, a user may modify the precision and scale by increasing them to something higher than what was discovered in the scanning process based on an understanding that future data can be configured to have numeric values that are bigger than what exists in the data as it is defined currently.

In other embodiments, system and interfaces enable the user to select display options to configure foreign key attributes to be included in flattened arrays, enabling the data to be joined back to parent level entities post transition. In some examples, foreign key attributes are selected by choosing from one of the array's parent entity's attributes. In further embodiments, the code generation process is configured to include these attributes in the flattened array object to allow for the parent entity and the flattened array to be joined relationally using standard SQL. In still other embodiments, the code generation process can be completed without any user configuration, but the system leverages the additional user configurations to optimize code generation. The optimized generation enables the resulting code to be more complete, and more functional upon the final transformation to a destination.

Examples of the methods, devices, and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements, and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element, or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

FIG. 1 is a block diagram of an example system 100 for transforming source data into a fully specified format. The system 100 can include a plurality of components each configured to perform operations as part of the transformation process or in an example alternative can perform the recited functions, algorithms, and/or operations without instantiating separate components.

As shown, the system 100 can access any data source (e.g., 102) having a plurality of formats. According to various examples, data sources (e.g., 102) having polymorphic data can be processed and managed where conventional approaches fail to handle the complexity of the source data. According to one embodiment, the system can instantiate an ingestion component 104 configured to define the source data set for processing. According to one example, the ingestion component 104 can be configured to define a connection to a data source, for example, that contains semi-structured data or unstructured data among other options. In further examples, semi-structured data can be stored in a variety of formats including JSON.

According to some embodiments, the system can instantiate a user interface component 106 configured to present options to users to enable definition of specific data source, connection strings, or other security data for respective data source. According to one embodiment, the UI component 106 can be configured to display a data source name, connection information, file path, among other options. The UI component 106 can work in conjunction with the ingestion component 104 to manage user specification of functionality to be executed as part of a data set transformation. For example, the system and/or components can be configured for schema discovery of semi-structured and/or polymorphic data that generates a fully specified schema for the data source.

According to some embodiments, the system and/or ingestion component 104 can be configured to manage attribute metadata, define specifications for SQL code generation (e.g., to transform the data source), among other options. In other embodiments, the system and/or components can be configured to manage construction of the data dictionary, security policy integration, and or semantic model code generation, among other options. According to one embodiment, the ingestion component 104 and/or interface component 106 can be configured to accept information about specific data store(s), which can include the duplication of stream messages (e.g., from a Kafka source, among other options). In some examples, the ingestion component can create a deduplication SQL expression that can be shown via the UI component 106. In some examples, the deduplication code can be presented in the user interface (e.g., by 106) for approval before use. In some embodiments, the system can include a code generation component 110 that is configured to execute declarative statements that incorporate scan metadata and/or user defined attributes to output, for example, SQL code. The output SQL code is configured to map a source data set to a fully defined target format.

Some embodiments leverage a large language model ("LLM") trained to output attribute descriptions, which can be used in construction of a data dictionary, among other options. In further examples, the system and/or UI component 106 is configured to display detailed information about a data source to facilitate data capture, formatting and/or analysis. In still other examples, the detailed information can be incorporated into inputs to the code generation component 110. The UI component 106 can be configured to facilitate information capture. According to one embodiment, the UI component is configured to display forms for detailing an object type (e.g., table), a formatted type (e.g., JSON), and column data type. If there is sample based schema data or any schema data for a source data set, the user interface enables an end user to upload or import that information. Although it is recognized that a schema based on a data sample will vary from the data source, the partial definition can be leveraged as part of the transformation process.

According to some embodiments, the ingestion component 104 and/or user interface 106 can be configured to accept output object settings for transforming a data source into a fully defined representation (e.g., 112). The system and/or components can be configured to accept output object settings to configure a data type of output objects generated, whether to use case sensitivity in the code generation process, whether doing so includes stream message metadata (if applicable), and/or a deployment location among other options. According to one example, the system can be configured to direct output to specific object types including, for example, a dynamic table. The system can determine targets automatically or via user interface requests.

In further embodiments, the system and/or components (e.g. 104-106) can be configured to accept definition of semantic layer or security settings as part of defining a source data set. The system can be configured to use any definition of semantic layer and/or security settings as part of subsequent code generation and/or to enable semantic layer views that access raw output objects. Further embodiments include the incorporation of configured row access and column masking security policies, among other options.

The system can also be configured to consolidate resultant data schemas. For example, schema information generated as part of transforming a source data set can be analyzed for potential consolidation. In one example the system can implement regex expressions to reduce a given schema into smaller schemas. These reductions can be used when multiple schemas contain similar data to simplify the resulting data model. According to other embodiments, the system enables users to specify schema filters as part of definition of a final format/schema.

According to some embodiments, the system can instantiate a data scan component 108. The data scan component 108 can be configured to analyze a data source to extract attribute metadata information as part of generating a fully defined schema for all the data records/attributes in a data source. The data scan component 108 can be configured to create a configuration for scanning any data source, and each data source can have one or more configurations. The scan component 108 can interact with the user interface component 106 to provide options for defining the one or more configurations. In various embodiments, the scan component 108 enables users to tailor computational power according to their needs as well as scheduling recurring scans to execute at defined intervals, according to a schedule, and/or a-periodically. The configuration can be used by the system to tailor code generation for flattening/transforming source data.

In some embodiments, the system enables users to define or modify options for automatic code generation to occur automatically in response to identification of any schema change via user interface displays. According to some embodiments, the scan component 108 is configured to use any connection information, security information, etc., (e.g., specified in a configuration file) to access the data source. The scan component 108 is configured to analyze the source data and execute recursive analysis into any source data until reaching the lowest level records and/or lowest level attribute value data in the source data set. According to one embodiment, the scan executed by the scan component 108 is configured to identify multiple different data types for the source data being scanned. In one example, the system assigns up to seven different data types for each attribute found as part of building a fully defined schema. The assignment can include four primitive data types (string, boolean, decimal, integer), two arrays (object and primitive) and an object data type among other options. For any attribute found in multiple records the system identifies that data as polymorphic when that attribute in the multiple record uses different data types (e.g., string in one instance and an object array in another).

According to one embodiment, the scan is configured to discover each polymorphic version of each attribute/record found. For various data types, the scan is configured to determine if the actual data can be more fully specified. For example, string data can be reviewed to determine if the actual data reflects a date or datetime value. Upon discovery of actual data with a more specific data type the scan can specify additional format information (e.g., datetime value can be used to determine a datetime format). The scan can also be configured to identify escaped or JSON blobs inside of data records/attributes (e.g., Jason blobs inside double quotes).

According to some embodiments, the capture of this information is recorded as metadata that can be surfaced by the system to the user and/or used to automatically configure discovered attributes in a data source's schema. In one example, XML source data can be scanned to determine the type of attribute/record identified-whether the attribute is an element or an attribute.

In conjunction with analysis of the source data the system is configured to enable further additional configurations and definitions of the metadata associated with the source data set. This information can be stored within the one or more configurations. The additional configuration information and/or further definition of the metadata is leveraged on the system to fine tune output code that will be executed as part of the transformation (e.g., produced by the code generation component 110). According to various embodiments, the additional data/configuration can specify information about source attributes including alias information, primary key information, unique information, contains enum values only, create virtual attribute information, among other options. Screen captures of associated UIs are described in further detail below.

The system is configured to allow, for example, users to specify this additional information to help code generation as part of the transformation. Further information that can be accepted and used for subsequent code generation steps include type inference information (e.g., output data type, daytime format, precision, scale, etc.). In still other embodiments, the system enables definition of the following information and/or any combination of: raw output object transformation information (e.g., null value expression, transformation type, transformation expression, etc.); schema consolidation information (e.g., consolidation reg section value to search for, consolidation SQL expression to replace the original value with, etc.); semantic layer/security policy information (e.g. add attribute to row excess policy, column masking policy name, column masking policy parameters, whether to include a specified column in the final output, a sequel expression to use in lieu of an original value, and alias name for the attribute in the semantic layer view, etc.); array setting information (e.g., including code generation, dynamic table alias name, semantic layer alias name, semantic layer row access policy name, relationship name, relationship description, relationship type, relationship join type, etc.); foreign key information, among other options.

According to various embodiments, the code generation component 110 is configured to accept information generated from the scan of the source data as well as the definition of any additional information to build transformation code to go from the specified source to a target data format/location. According to one embodiment, the code generation component 110 is configured to construct SQL code necessary to flatten a specified data source (e.g. semi-structured, hierarchical, etc.) into a fully specified data format. In other embodiments, other output code formats can be used. According to one embodiment, each version of each attribute discovered in the scanning process is configured to have a declaration in the generated code which can be used to build the specific column name for the data type (e.g. specified as attribute_name_data). The format/generation of the naming provides a fully specified definition for all attribute values/records in the source data to the target mapping. This approach, definition, and/or mapping provides a format that ensures an output column's data type will not change. For example, even with polymorphic versions of an attribute that can be discovered using the components/functionality discussed, having new data types/values results in a new column having a unique name and data type, completing a new a fully specified definition without impact on the prior mappings to the fully specified format.

Example Code Generation

According to some embodiments, semi-structured data can be transformed or flattened into relational tables for the purpose of analysis. The generated code is created for the purpose of transforming hierarchical data stored in a semi-structured format like JSON into a series of relational tables so the data can be materialized. The benefit of materialization is a significant performance increase during the retrieval of data from the materialized table. Without materialization of the semi-structured data the flattening process would need to occur during the retrieval every time before analysis can occur. The other benefit to the materialization of the flattening process is that a significant amount of compute is saved as the semi-structured data is flattened once instead each time the data is retrieved by a user for analysis purposes.

The generation process can be executed to create three main types of objects. One is a series of tables used to store the transformation of the raw semi-structured data into flattened relational data that represents the original hierarchy of the semi-structured data. As an example, a JSON document can contain customer information. And for each customer, there is a list or array of invoices. And for each invoice there is a list of items. In this example, this hierarchy represents three levels of hierarchical structure. When transformed, this structure will be flattened into three relational tables. The customer table would be the parent table. The orders would be a second table that is a child to the customer's parent table. The order details are transformed into a third table and would be a child to the orders table or a grand-child table to the customers table.

According to various embodiments, the systems and methodologies described can be implemented via an application, accessed and/or executed by end users. To further understanding, embodiments including the application are described. For example, the application (e.g., via user interfaces described) allows a user to change the name of any discovered array or attribute prior to code generation. The application is also configured to allow the user to configure how any discovered arrays are related by choosing specific attributes to act as foreign keys between arrays. As an example, each customer object could contain an attribute with an original name of "CUSTID" which contains a unique string value identifying the customer. The user could rename this field to "Customer_Id" and then specify this attribute as the foreign key to the orders table. During the code generation process the "Customer Id" attribute would be materialized into the customers table in addition to the orders table. By materializing the "Customer_Id" into both tables, the user is now able to write standard SQL to select information from both materialized tables by joining them together using the "Customer_Id" field.

According to further embodiments, as part of the code generation process a column is generated for each combination of data type and attribute name. This is referred to as an Immutable Typed Derived Column or "ITDC." The inventors have created this field and nomenclature to represent that the value that is generated for a particular column will only ever be of one data type. The SQL generated for an ITDC will check the type of data to determine whether the value will be returned for a given row. If the data type of the actual row does not match the data type of the ITDC being created then a null value will be returned for the ITDC unless the user has configured a null value expression. In the case of an integer data type a null value expression could return a value of zero instead of a null. The creation of an ITDC facilitates the transformation approach because without this immutability, any downstream processes depending on the data type of a specific column will be negatively impacted if the column contains more than one type of data such as a string and an array. If the scanning and discovery process finds that an attribute has more than one data type such as a string and an array then two different ITDCs will be generated for that attribute. On subsequent scans, if additional data types are discovered then upon regeneration of the code, new ITDCs will be created for the new attribute. In examples where the user configured an alias for each polymorphic version of the attribute, then the alias name will be included in the code generation.

The code generation process can also include all of the other metadata specified, inferred, or discovered, such as the output data type, precision, scale, datetime formats, etc. If more than one datetime format has been provided by the user because the values in the raw data could be formatted differently, additional SQL is generated as part of the ITDC to determine the correct format for a specific row (e.g., based on its defined format) and is configured to return the value using the proper format that matches the format of the value in the raw data.

Additional data structures have been created to store additional metadata about the schema of the data source based on the scanning, discovery, and metadata generation to identify the hierarchical nature of the semi-structured data. The additional data structures and metadata are used to generate the code necessary to select data from the appropriate materialized table. As an example, when the customer data at the root level of the JSON document is materialized, an ITDC is generated containing the array of orders with a nested array of order details for each customer row. The SQL code created for the orders table is configured to generate a column that contains the array of order details along with all of the other attributes in the orders array. To do this, the application employs metadata stored to know that the materialized orders table will need to select data from the materialized customer table and also know which column contains the materialized orders array. These values are captured from the metadata and used to create corresponding code.

For example, when the order details table is materialized, the same type of information is used to know that the order details array column exists in the materialized orders table. And since each materialized table can be aliased as configured by the user, this aliased relationship information can be stored and used by the application. As there is no limit to the level of hierarchy that can be discovered, the code generation process is configured to account for this unlimited level of relational table creation.

Another unique feature of the code generation process includes the ability to generate SQL that refers to case sensitive column names. Semi-structured attributes names can many times contain special casing such as the use of both capital and lowercase letters as well as special characters such as pipe delimiter. The code generation process will enclose the names of these attributes with double quotes which makes the SQL valid. If the double quotes are not added and the column is not aliased then the column name will be invalid due to the special characters and will not compile. This can also be a factor if the case sensitive column name is used as part of a foreign key in a relationship between two materialized tables.

Optionally, a user can choose to generate a metadata table for the materialized data that is configured to track the last date time of when records are inserted or updated. This can be valuable for users to know when data has been refreshed such as in the case of fraud detection. In that example, downstream processes may want to evaluate data in the materialized data that has changed in the last hour. The second type of object generated by the application is a set of Database Views that select data from the materialized tables. Each view will contain a corresponding ITDC that will refer to the aliased ITDC in the materialized table. Each ITDC in the view can have its own alias as well. The view name itself can also be aliased. The views also incorporate additional business logic that can apply additional transformation to each ITDC in the table. Various embodiments manage business logic as post-materialization transformation because they are not required to perform during the materialization process. The views also contain all of the defined security policy SQL that is configured to provide the capability to limit access (e.g., the number of rows a user can see, among other options) and also mask certain column values that a user is not allowed to see. The metadata required for this code can be provided as part of the configured metadata. When configured, the SQL generated will include the row policy and include any selected columns used by the row access policy. The generated SQL will also include any column that has been configured to use column masking policies. Each view for nested arrays can be configured by the user to use a unique row access policy. The user can also configure the metadata to add each foreign key to the row access security policy.

As discussed, the design of the SQL generated by the application for semi-structured data significantly minimizes the technical debt that is normally created by conventional approaches when building data pipelines for this type of data. By using ITDCs, users are guaranteed that existing column definitions and data types will not change. Only new columns and new materialized tables and views will be added. The only technical debt created would be in the case where a user changed the alias of a column or view after the initial deployment. This is a much simpler refactoring of downstream code as opposed to the type of data changing in a column from a string to an array. The application is also configured to automatically regenerate the code if new schema information is detected in subsequent scans of the data source. This generation of accurate flattening can save users a tremendous amount of time and eliminate any potential data quality issues and at the same time make all data in the semi-structured data source available to the user for downstream use.

Figure 2:
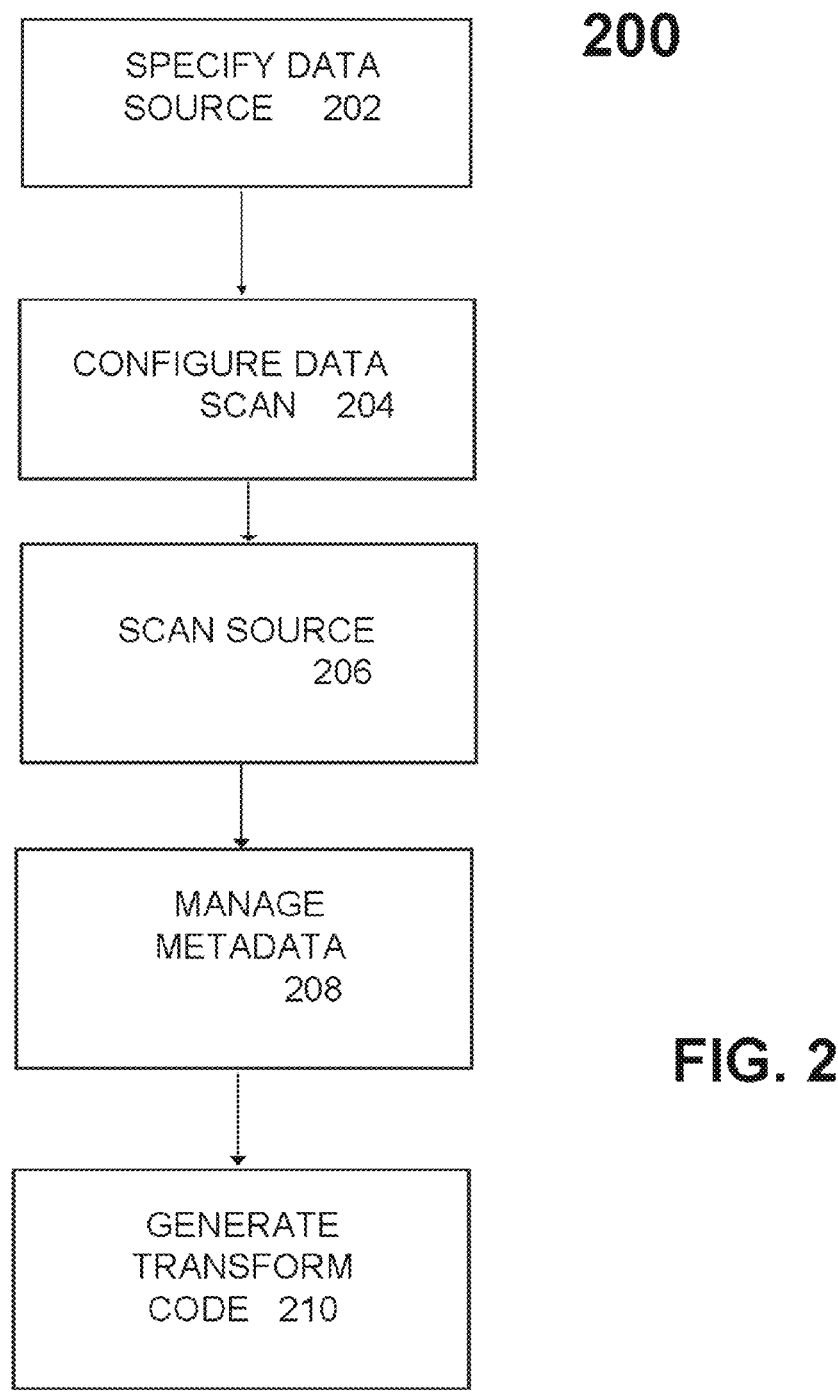
FIG. 2 is an example process flow for transforming source data, according to one embodiment.

Shown in FIG. 2 is an example process 200 for transforming a source data set into a fully specified and dynamic target format. Process 200 begins at 202 with definition/identification of a source data set or source data (e.g., JSON data source shown in FIG. 5). Various examples describe execution of process 200 with respect to JSON data to highlight and facilitate understanding. Various data formats can be used as source data (e.g., structured, hierarchical, semi-structured, etc.) and various end stage architectures can be used. Step 202 can include specification of the data source, or in some alternatives configuration for a data scan and/or transformation can be done at 204.

Figure 6:
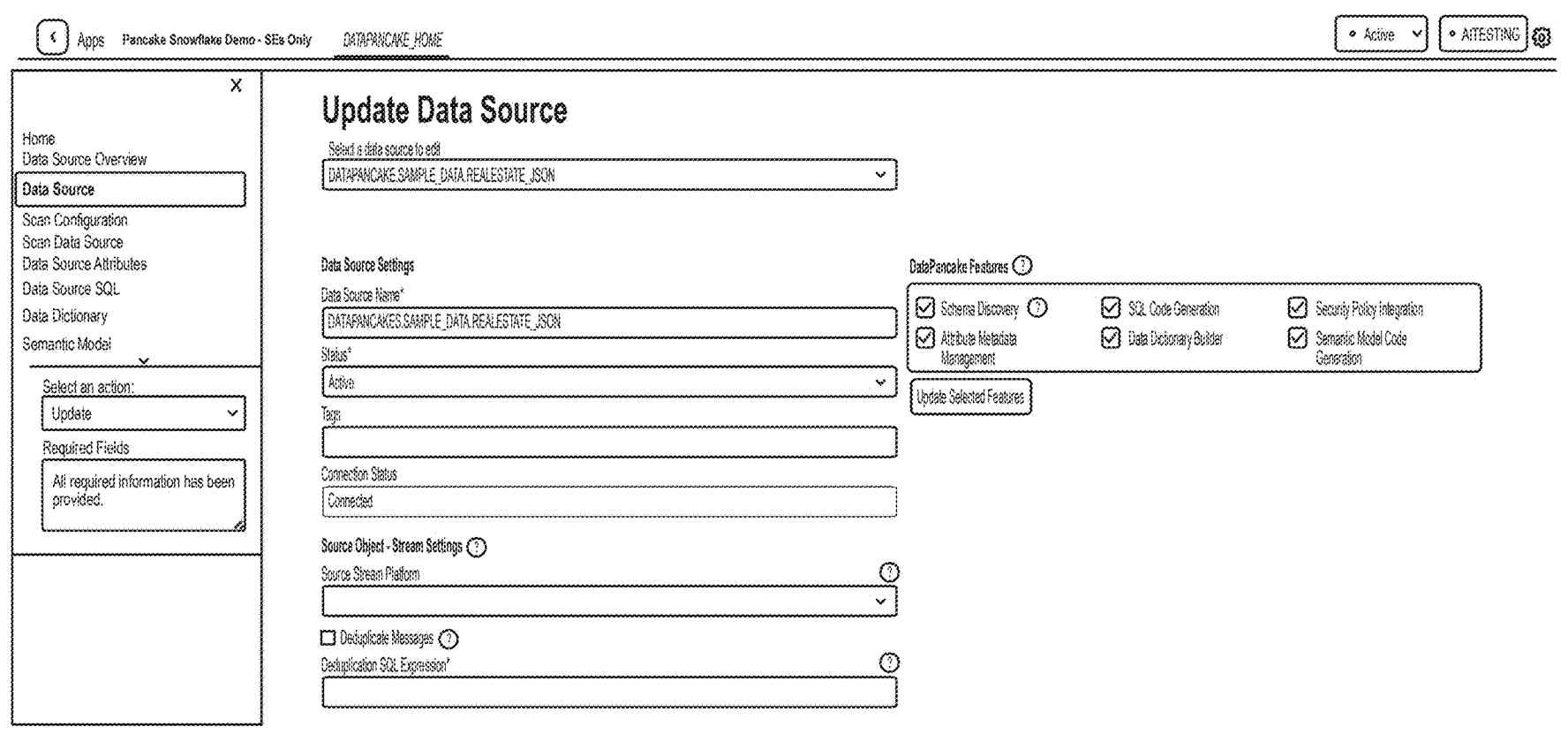
Figure 7:
Figure 10:
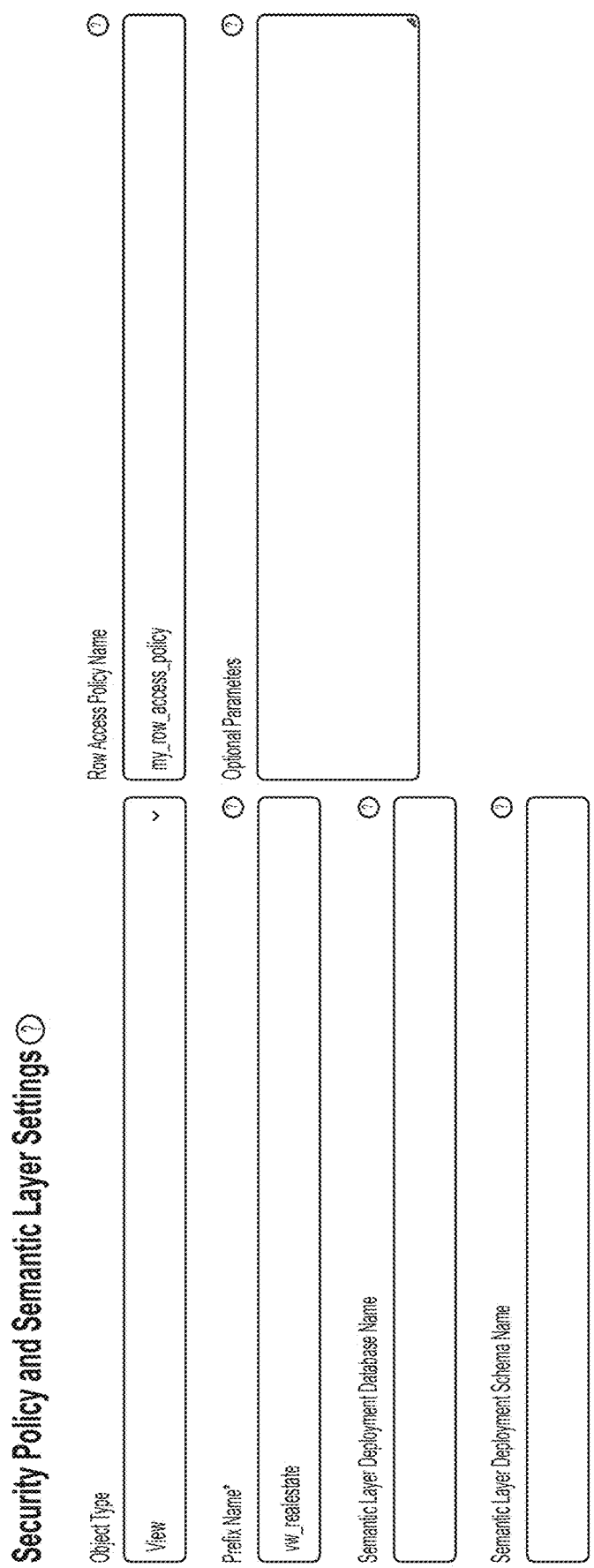

According to some embodiments, the specification can include definition of a connection to a data source, for example, that contains semi-structured data. Definition of the connection can include authentication information and/or security settings. In various embodiments, source data can include semi-structured data formats which can include JSON. Specification of a data source can include configuration information on how the generated code will be created during the transformation. For example, configuration information can include specification of how the generated code will be created. Various embodiments provide for specifying a number of options including: deduplication of stream messages (e.g., configuration settings applicable if the data in this source object is coming from an event streaming platform such as Kafka-shown by example in FIG. 6); source object settings (e.g., a data source object can be a column in table, view, or external table in a database schema, where object is the source of the data for the data source that contains semi-structured data-shown by example in FIG. 7); output object settings (e.g., settings are used to configure type of output objects generated, whether to use case sensitivity in the code generation process, whether to include stream message metadata (if applicable), and the deployment location, among other options-shown by example in FIG. 8 and FIG. 9); semantic layer and security settings (e.g., if configured, the security policy and semantic layer settings are used to generate the code (e.g., SQL) for semantic layer views that access the raw output objects and include the incorporation of configured row access and column masking security policies, among other options-shown by example in FIG. 10); schema consolidation settings (e.g., schema consolidations are used to reduce schemas into a smaller schema using regex expressions-shown by example in FIG. 11); schema filters (e.g., schema filters are used to exclude parts of the schema from the code generation process, where If filtered, attributes discovered will be captured and recorded with a record status of 'inactive' and can be changed back to active at any time-specified for example in a UI as shown in FIG. 11).

Figure 12:
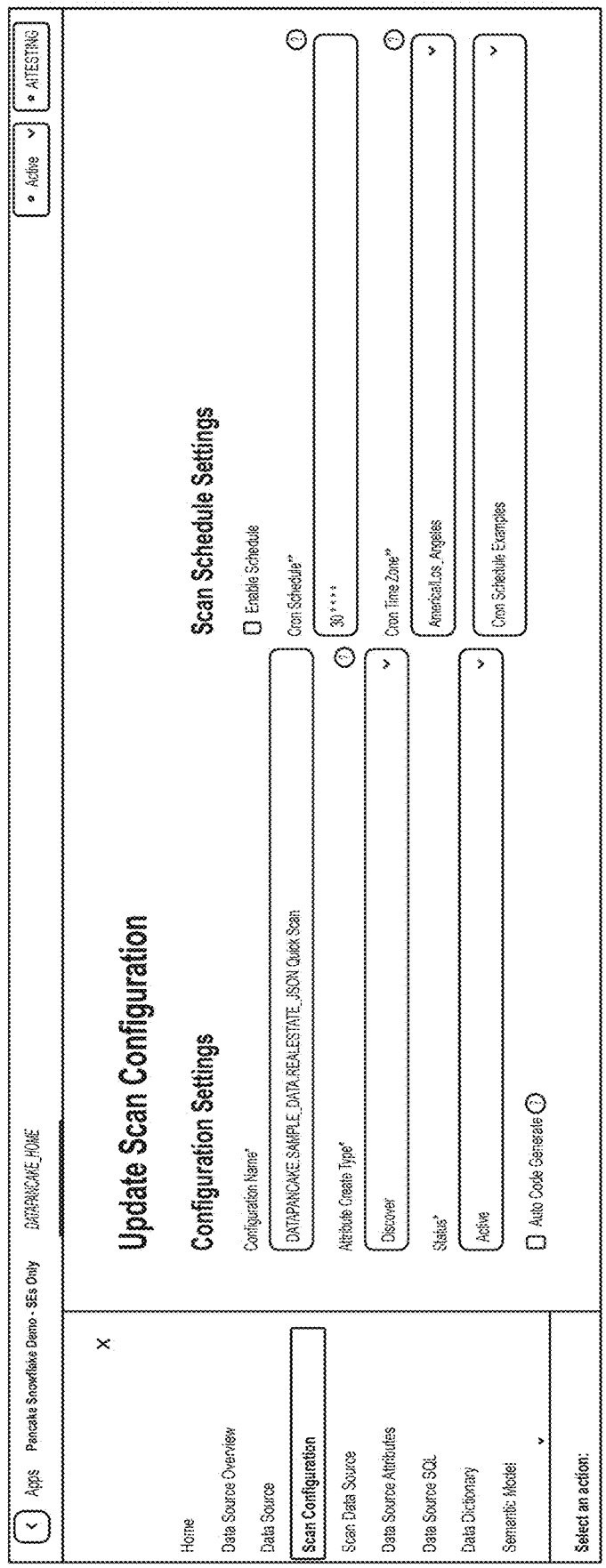

In further embodiments, defining configuration information can include creating configuration information for scanning a respective data source. According to various embodiments, each data source can have one or more configurations. For example, process 200 can enable a user to configure how much data they want to scan, how much compute power they want to use to complete the scan, and whether they want to set the scan process to execute at a recurring time interval, among other options. In further example, a user can also specify for the code generation functions to execute automatically if any type of schema change is detected-shown by example in FIGS. 12, 13, and 14).

Figure 15:
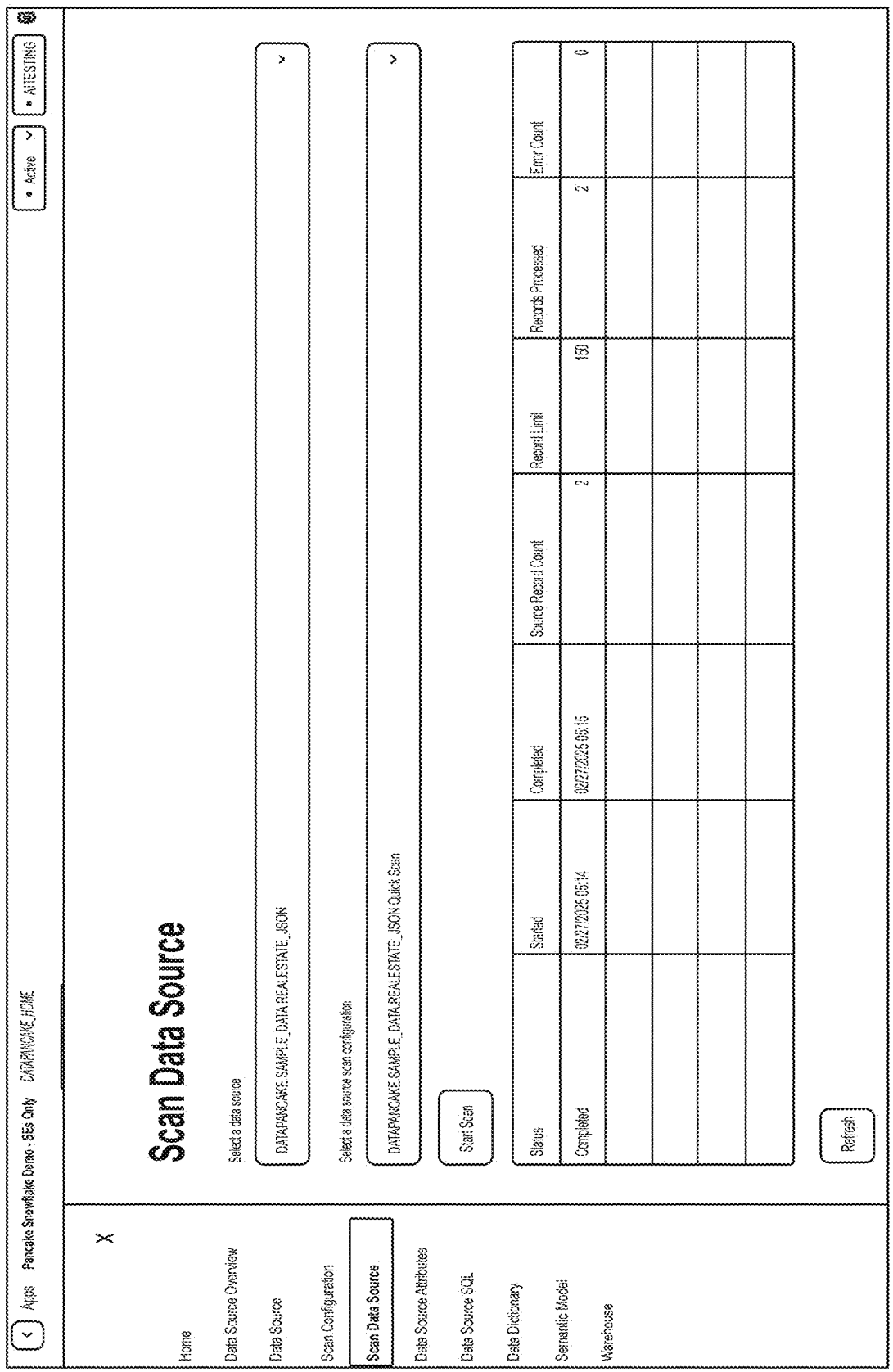

Process 200 continues with 206 scanning the data sources according to any configuration information. Scanning uses the data source connection information in conjunction with the scan configuration settings to initiate a scan of the data source. This step recursively evaluates the data source specified (e.g., semi-structured data) for each record in the data (e.g., table) to discover the full and complete schema. Scanning can be configured to identify a plurality of data types (e.g., up to seven different data types) for each attribute/record found. For example, if an attribute is found in multiple records and uses different data types (e.g., a string in one instance and an object array in another) the attribute is considered to be polymorphic. The scanning discovers each polymorphic version of each attribute. Discovery is configured to infer if a string is actually a date or datetime value along with its datetime format (by examining data within a string). The discovery process is configured to search for escaped or JSON blobs inside of double quotes appearing in any source data. The scanning generates metadata for all discovered attributes in the data source's schema. Subsequent functions and/or steps enable users input to configure the metadata captured during scanning. In further example, given an XML source the scan and metadate capture/definition determines the type of attribute for source data-whether the attribute is element or an attribute. FIG. 15 shows an example UI to select a data source, configuration, and to trigger execution of a scan under those parameters.

According to further embodiments, process 200 continues with managing metadata at 208. Metadata management includes providing additional configuration of the metadata to determine how the final output code is generated for a transformation. FIGS. 16-26 are example screen captures of UIs configured to manage metadata. The UIs allow definition of any one or more or combination of the following:

A. Source Attributes (e.g., FIG. 16-17):
   Alias.
   Primary Key
   Unique.
   Contains Enum Values only
   Create Virtual Attribute (e.g., FIG. 18)
B. Type Inference (e.g., FIG. 19)
   Output Data Type
   Datetime Format.
   Precision.
   Scale
C. Raw Output Object Transformation (e.g., FIG. 20).
   Null Value Expression.
   Transformation Type
   Transformation Expression
D. Schema Consolidation (e.g. FIG. 21)
   Consolidation Regex Value to search for
   Consolidation SQL Expression to replace the original value with
E. Semantic Layer-Security Policy (e.g., FIG. 22-23).
   Add attribute to Row Access Policy.
   Column Masking Policy Name
   Column Masking Policy Parameters.
   Whether to include the column in the final output.
   A SQL expression to use in lieu of the original value.
   An alias name for the attribute in the semantic layer view
F. Array Settings (e.g., FIG. 24-25).
   Include in Code Generation.
   Dynamic Table Alias Name.
   Semantic Layer Alias Name.
   Semantic Layer Row Access Policy Name.
   Relationship Name.
   Relationship Description
   Relationship Type.
   Relationship Join Type
G. Foreign keys (e.g., FIG. 26).
   For all nested arrays that will be flattened into related tables.

Process 200 continues at 210 with generation of transformation code. For example, at 210 process 200 generates SQL code necessary to flatten a semi-structured data source. The code can include options to enrich the source data (e.g., with metadata definitions), and/or incorporate security policy information to provide for data security (examples shown in FIGS. 16-26). In various embodiments, each version of each attribute discovered in the scanning process is defined by a declaration in the generated code.

In further example, the output code includes a declarative statement for each version of each attribute that is defined by a common and extensible format (e.g., column name of [attribute_name]_[data_type]). As discussed, identifying each level of each polymorphic data attribute enables the fully defined representation of any source data set. According to various aspects, this allows downstream processes to have the assurance that an output column's data type will not change. Rather, if and when new polymorphic versions of an attribute are discovered a new column is readily accommodated and can be automatically created for the output object. The various aspects described above are tailored individually, collectively, and in various combinations to prevent downstream processes from breaking. The various implementations generate a fully defined representation of polymorphic data in any setting, for example, in semi-structured data environments, but also in structured data environments where the data changes or evolves in any way. An example of code generated on an example data source is shown in FIG. 27 and view creation or replacement in FIG. 28.

The output transformed data (e.g., FIG. 29) is now fully defined and can be accessed, queried, visualized, etc. using, for example, SQL query statements with guaranteed accuracy and without error. An example of a SQL statement using the final flattened dynamic tables follows:

```
select * from raw_realestate L1
inner join raw_realestate_units_obj_arr L2
    on L1."property_id_str" = L2."property_id_fk"
inner join raw_realestate_units_obj_arr_tenants_obj_arr L3
    on L2."property_id_fk" = L3."property_id_fk" and
    L2."unit_id_str" = L3."unit_id_fk";
```

Figure 3A:
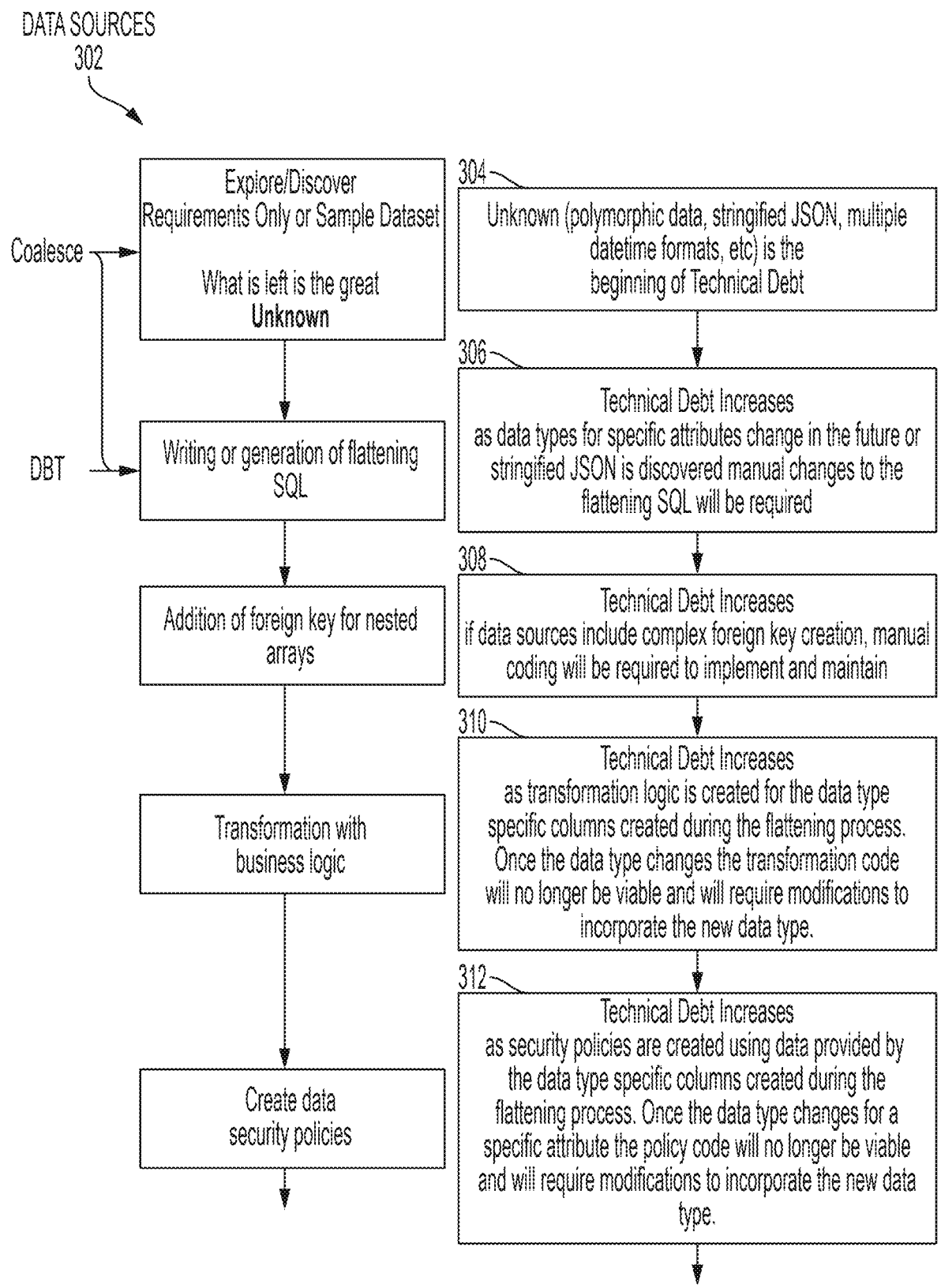
FIGS. 3A-3B is an example logic flow, according to one embodiment.
Figure 3B:
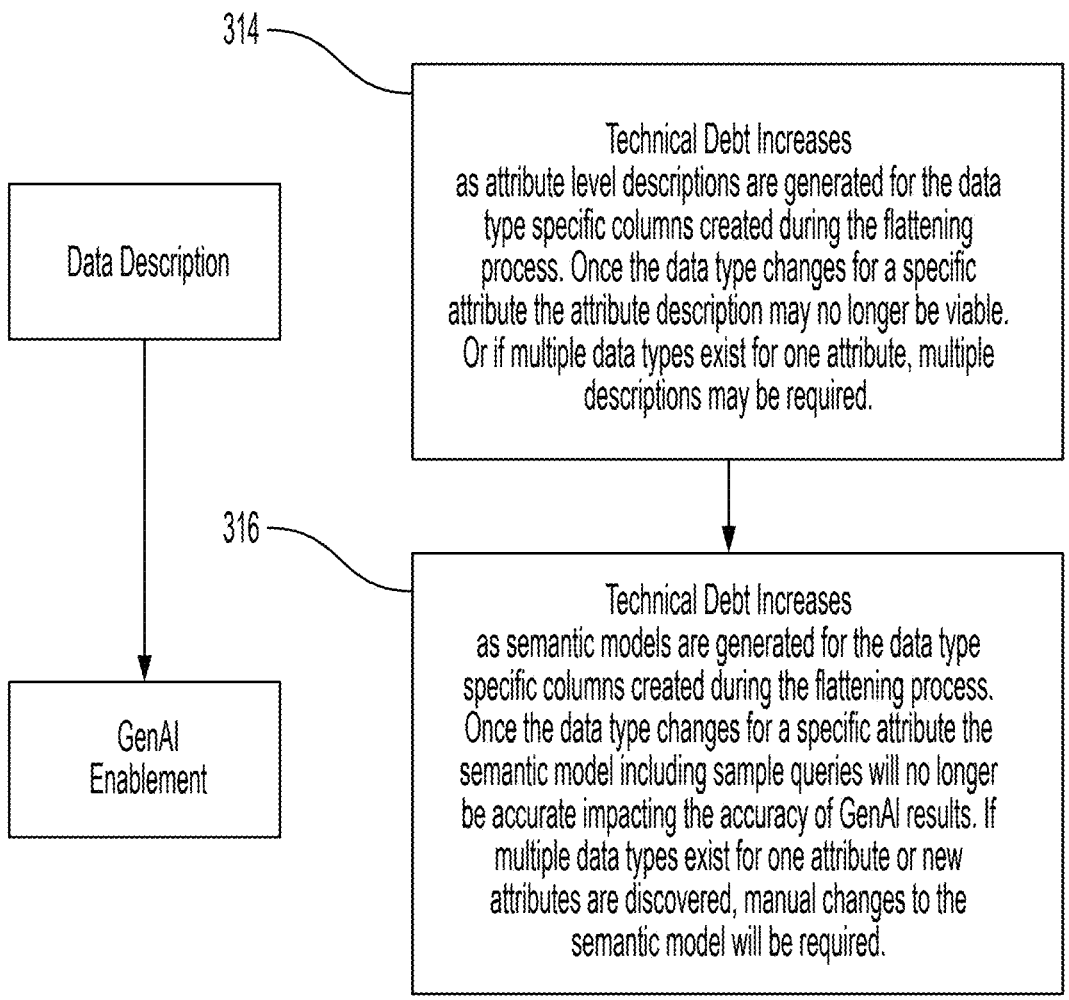

Various embodiments incorporate the various functions described above to improve data definition, mapping, and/or transformation. The various combinations of the elements above are also included as embodiments, and include embodiments that combine, re-order, omit, the steps and/or functions above, among other options. To further facilitate understanding, FIGS. 3A-3B illustrate various points of technical debt incurred under conventional approach. The identification of such points of failure, let alone their resolution, represents some of the failures in conventional approach to these problems over in various embodiments and examples discussed herein.

Shown in FIG. 3A-B is an example flow 300 for processing data sources 302 and building data schemas. The process flow shown in FIG. 3A-B illustrates the recognition of problems and operations to transform various data sources into fully understood data repositories. As shown, various data sources 302 can be processed (even by existing processing systems). The inventors have realized that conventional approaches results in significant technical debt (e.g., deviation between schema and source data, deviation in data dictionary and source data, and put simply including any difference in understanding of the full parameters of the data source and the actual full parameters of the data source).

For example, at 304 and 306 the output of example approaches for defining the scope of the data source are shown with the approaches used by example conventional approaches. For example, Coalesce is used to process a data source to develop understanding of the parameters of the data source. However, Coalesce is configured to explore the data discovery requirements in only a sample data set from a data source. Anything outside of the sample data set is unknown including any specific parameters associated with the unsampled data. The unsampled data becomes the first hurdle and defines the beginning of technical debt for understanding and utilizing any data source. Similarly, DBT approaches attempt to write and/or generate flattening SQL statements for source data. In this example, technical debt exists where polymorphic data has been defined and cannot be flattened using conventional approaches (e.g., DBT). Additional technical debt is developed as specific data types for specific attributes change in the future.

According to further embodiments, the initial technical debt incurred (e.g., 304-306) at the beginning of the process cascades and in some examples is increased exponentially at each further iteration (including any use of an approximate model of the data source (Coalesce), or a not fully defined representation (e.g., DBT)). For example, shown at 308 are changes to a data source that occur after definition of a data model, schema, or data dictionary. In the example, at 308 the data source is modified with additional foreign keys for nested arrays. In this example, when a data source includes complex data structures including complex foreign-key creation, conventional approaches fail to track the changes and even manual approaches are challenged to implement and maintain an accurate reflection of the existing data source.

Another instance of increasing the technical data is shown at 310. For example, transformations can be imposed on the data source with business logic integration. According to one example, integrating business logic transformations is made necessary by adding functionality or adding business requirements to existing data architectures. The additions are often implemented as business logic or code that are not well reflected in a data model. Understanding business logic transformations are required for data types in specific columns, for example, that may be created during the flattening process in order to produce a complete and accurate representation as output. Once a data type changes, existing transformation code is no longer viable and would require modification to incorporate new data types. These challenges are exacerbated over time as different business logic integrations are introduced and may result from varying even report titles or source targets, among other options.

Shown at 312, is yet another example of technical data increases as various parameters of the data source may change. For example, new data security policies may be implemented and enforced on a specific data source. Any new security policies can be created on source data and may be applied to specific data types, specific columns, specific fields, etc., and/or may be applied to various data attributes generated during the flattening process. If any data type changes for any specific attribute specified in a security policy, any existing associated code is no longer viable and again requires modifications to incorporate a new data type in the source data.

As shown at 314, the differences between a data source and any representations of the data source can spread further. For example, where data descriptions change over time, which can include attribute level descriptions, the differences between what is known about the data source and what is actually contained in the data source continues to diverge. According to one example, as attribute level descriptions are generated for a given data type and specific columns created, for example during a flattening process, in conventional approaches the end result is a static representation of those descriptions tied to those data types and/or specific columns. Any change, even in the descriptions, increases technical debt that cannot be resolved with re-executing the flattening process. Further, any data type changes likewise result in no longer viable outputs because any attribute descriptions, data types, and/or specific columns are no longer matching or fully defined. In other examples, where multiple data types exist for one attribute, multiple descriptions may be required, and each one is subject to change. Any such changes would break linkages to existing descriptions, again increasing technical debt.

At 316, additional technical debt can be introduced when, for example, data is adapted for use with artificial intelligent models or as AI training data. According to one example, semantic models can be generated for specific data types and/or columns in a data store or source which can occur during the flattening process. Once semantic models are defined, if the data type changes for a specific attribute the semantic model including any sample queries are no longer accurate affecting the accuracy of machine learning models built upon those data sources and/or flattened definitions. Similar to 314, where multiple data types exist for one attribute or as new attributes are discovered the semantic model diverges from the underlying data and can even render the existing machine learning model ineffective. By managing fully defined representations that are extensible (handle addition of new data types are polymorphic data) various embodiments resolve this technical debt present in conventional approaches, among other options.

According to various embodiments, creating and maintaining data pipelines for semi-structured data is one of the most expensive and time consuming tasks that data teams are faced with today. The process of creating these pipelines is also fraught with the risk of producing inaccurate or incomplete data leading to several downstream data product impacts. Data teams face many challenges and risks to schema discovery and flattening such as: an evolving schema; polymorphic data; hidden stringified JSON data; foreign key management; path reference accuracy; exception handling; and destination data type accuracy, among other options.

Various embodiments resolve these challenges so that a data team can focus on data cleansing, enhancing and enriching. Furthermore, many conventional systems do not have adequate and current documentation to provide guidance to the engineers responsible for building these pipelines. As these challenges add up the task begins to appear impossible. Today's data management applications and integration platforms are not designed to handle the complex issues that data teams are challenged with when processing semi-structured data. The process of creating and maintaining these types of data pipelines is often resource, cost, and time prohibitive. The outputs are often poorly-defined, inaccurate, and unmanageable. As a result, many companies are not able to leverage this type of data which can lead to operational inefficiencies, lost revenue or increased opportunity costs. At best, they can only create pipelines to extract slices of data that meet their immediate needs and in doing so create tremendous amounts of technical debt and increase the risk of downstream data quality issues.

Various challenges exist when processing, for example, JSON data. Because JSON is schema-less, data types of individual attributes can change over time. An attribute named "address" can start out as a simple string such as "123 Main St." and then later transition to a complex object array with nested objects and additional arrays containing multiple addresses. There are no schema restrictions in the JSON format to prevent attribute data types from changing. Over time, these data type changes will lead to datasets that contain polymorphic data.

The impact of polymorphic data can result in broken downstream processes that expect an attribute to be of a certain data type. Worse, if the parsing and flattening process does not handle the data type change appropriately, it is possible some data can be lost before it ever reaches the downstream processes relying on that data. Another major challenge in using schema-less data formats is that JSON objects can be embedded as strings. With any valid data format such as XML, Parquet, Avro, ORC, or JSON, a string attribute can contain a stringified or escaped complex JSON object that has its own undefined schema. If the schema of that stringified JSON is not documented, then the schema must be somehow discovered. The inventors have realized that another challenge is that each record in the data source could contain a unique JSON object. Various embodiments ensure this discovery to ensure that each record's JSON schema is captured to output an accurate data pipeline. For example, stringified or escaped data is identified and captured in the fully defined representation.

Where source JSON data flowing through a pipeline contains polymorphic data or stringified JSON, and there is no compensation in the processing logic, then the output results in downstream data quality issues that impacts the accuracy of every process that relies on that data. Various embodiments solve these issues by using its innovative and patent pending process to discover every polymorphic version an attribute has ever taken the shape of. Various implementation can be referred to as 'Data Pancake', which is configured to identify all variations in attribute data types, ensuring complete schema discovery for accurate data pipelines, even in highly complex and deeply nested datasets. Data Pancake can also discover JSON inside of any string attribute. This discovery is also recursive-so if a stringified or escaped JSON object exists inside another stringified JSON object, even those instances are discovered and associated schema identified. Under these conditions, when the data is flattened, each polymorphic version of every attribute is extracted as its own column. For example, automatically generated code includes the SQL for each polymorphic version that is used to create a dynamic table.

Figure 31:
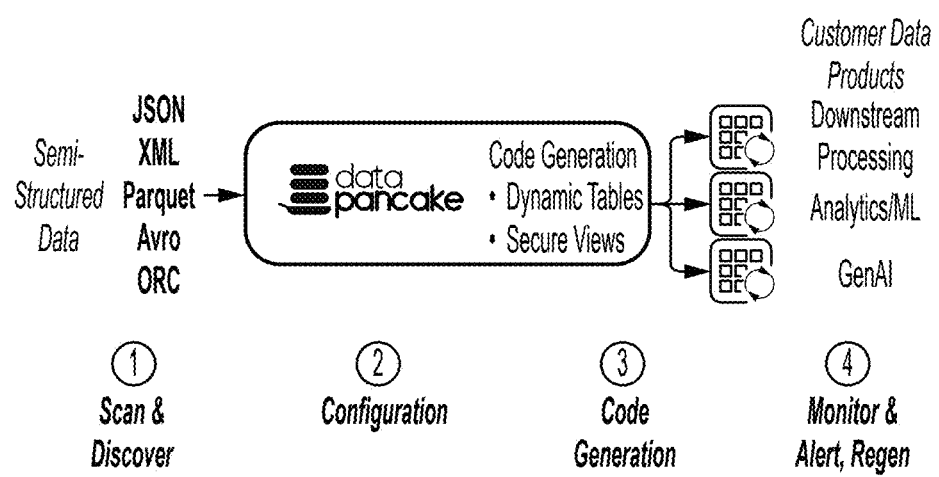

For example, FIG. 30 shows an example data source and property_type attribute that is used both as a string value and as an array (e.g., property_type: "Mixed-use" (left) "usage": "Commercial", "sq_ft": 20000). These differing uses and data types cause conventional approaches to fail, but are specifically identified and defined in output representations. FIG. 31 is a block diagram of an example Data Pancake implementation.

Further embodiments are configured to handle the inevitability of schema evolution (a.k.a. schema drift). For example, as a company's business model involves, their competitive landscape changes, its operational procedures are enhanced, internal innovations are incorporated into proprietary technology, and many times the type and structure of underlying data sources will change as well. Most data sources that have change management policies in place know how to handle changing schemas and any associated data migrations required. However, for various reasons, not all data is migrated after a schema change. Further, various conventional implementation fails to fully define or even track these schema changes sufficiently.

Existing organizations face challenges when they are required to manage and process historical data and its schema alongside current data and its updated schema as part of their overall data strategy. The result is the processing of multiple versions of a data source's schema. It is realized that such data is eventually transitioned into data repositories such as datalakes, datalake houses, and data warehouses, and each schema change to each data source must be handled separately, but also accurately. Missteps or errors in this change management process results in data quality issues downstream impacting the data products that rely on it, and is endemic in conventional solutions.

Data lakes and warehouses are tasked with incorporating all versions of a data source's schema over time. There are several risks associated with maintaining the data pipelines for semi-structured data when schema evolution or drift is present. If the change management process for the source application does not include robust communication, discovery, development, and testing components with all downstream consumers, then data quality issues are guaranteed to happen. Data quality issues may take the shape of one of the following: disruptions to existing data pipelines in production which interrupt the flow of data, missing data due to changed paths or the addition of new paths, new stringified JSON data, or inaccurate data due to the change of an attribute's data type. Each of these data quality issues represents an example of technical implementation failure. Any of these data quality issues can have a significant impact on many downstream data products including reporting, analytics, machine learning, GenAI, and many others.

Data Pancake solves the issue of schema evolution and drift in various embodiments by enabling continuous/scheduled/a-periodic scans of data. The scan can be configured to include all historical data as well as newly produced data or any target comprising a sub-set of those choices. Data Pancake users can configure the time interval of how often their data is scanned such as hourly, daily, weekly, etc. The efficiency of processing cost for scanning this data is highly effective and improves over conventional approaches when compared. Considering a data source with one million rows with a variant column containing 1 MB documents can be scanned for just a few dollars in compute costs-reflecting highly efficient processing in terms of compute cycles and expected/average cost of compute resources. Data Pancake also generates accurate and/or appropriate metadata after each scan so that users can configure/customize alerts to notify the appropriate personnel when schemas have changed or when new polymorphic versions of an existing attribute have been added. Users can configure Data Pancake to scan data in lower environments as well-system level, development, Q&A, etc. The ability to scan data sources, for example, under development enables users to know of potential schema changes before a production version/production application is ever affected. This level of advanced notification represents a long term significant need in commercial implementation, as the inventors are unaware of a current solution. Various embodiments are tailored to address the risks of flattening hierarchical data. For example, there are several risks associated with flattening hierarchical data such as JSON.

Path Referencing Example

When flattening JSON, if the correct path is not specified an error may or may not be raised depending on the method used to access the path. In python for example, if the get method of an object is used to retrieve a value an error would not be raised. If SQL is used to extract a value from a specific path, an error would also not be raised, and instead, would return a null value for that path. When these silent errors occur, there is no way of knowing in conventional approaches whether the data is actually null or whether a path reference error has occurred. These types of errors can lead to significant data quality issues, that are resolved in examples and embodiments discussed herein. Various embodiments can validate null returns by adding data to a null return variable and confirm the insert or add does not return an error. On an insert, an error demonstrates an invalid path. Once confirmed any test entry can be removed or deleted.

Foreign Key Identification Example

The inability to correctly identify and inject foreign key values into all nested arrays as they are flattened out into new database objects can be challenging, and a point of failure in conventional approaches. Data formats like JSON are not meant to store relational data like a relational database. A nested array not having a foreign key value that relates it to the parent object it is under is commonplace in JSON. This means that foreign key values have to be identified and injected (e.g., via a recursive scan and metadata management discussed above) so that post flattening, the resulting database objects can be joined back together using those foreign keys. Various embodiments of the system are configured to handle when there is not a surrogate key, but instead one or more attributes making up a compound key. If the foreign keys are not injected correctly (unavailable in conventional approaches), it is impossible to join the flattened database objects together. Various embodiments handle these circumstances via the fully defined representation and operations to build them.

Nested Object and Array Depth Example

JSON and other hierarchical data formats do not have limits for the depth of nested arrays and objects. Without proper discovery, conventional approaches miss attributes which results in a loss of data. Because the schema of a JSON object can change from one row to another, various embodiments are configured to scan and discover each JSON object's schema independently. Various examples describe a recursive approach configured to discover nested object and any array depth. For example, Data Pancake is configured to turn complex semi-structured data into truly relational streams, which are usable to find buried insights in even the most complex data sources.

Stringified or Escaped JSON Example

Hierarchical data is able to store stringified or escaped JSON surrounded by double quotes inside a string attribute. Also possible is for stringified or escaped JSON to be nested inside another stringified or escaped JSON string. This poses several challenges. Escaped or stringified JSON can have a different schema on a row by row basis and can be stored in other data formats that adhere to other strict schemas such as Avro, Parquet, and ORC. If the stringified or escaped JSON is not discovered accurately, then the data will not be parsed and flattened correctly leading to data loss. Conventional approaches suffer data loss here, and various embodiments improve over those approaches to yield a fully defined format and/or fully defined metadata so that the output representation suffers no data loss.

Destination Data Type Accuracy Example

Hierarchical or semi-structured data can have a single attribute that stores date, time, or timestamp values in multiple formats. If this data is not parsed, flattened, and transformed into the correct destination data type, then data loss occurs, resulting in additional data quality issues. If the time zone information is lost or if the scale portion of a decimal value is left off because of a conversion to an integer, data can become inaccurate leading to additional data quality issues. Many conventional approaches fail in this regard.

Various instances of Data Pancake resolve these issues by first scanning the entire data source to discover the complete and consolidated schema of every row. In various examples, Data Pancake is configured to examine every string attribute in search of stringified or escaped JSON and, if found, discover the schema even if the schema changes from one row to the next, regardless of the nested depth. Data Pancake also provides the user with the ability to configure foreign keys for all nested arrays. These functions allow for accurate relational design and the joining of all flattened database objects for downstream consumers. Data Pancake generates the appropriate SQL for creating dynamic tables which ensures path reference accuracy and eliminates any silent parsing and flattening errors. As part of the discovery process, Data Pancake also infers the correct destination output data type and if applicable, the correct datetime format. Data Pancake can even support multiple datetime formats per attribute. Data Pancake can also detect the difference between integer and decimal data types and can support an attribute containing both data types at the same time. As a result of these transformative and groundbreaking data management capabilities, Data Pancake eliminates the risks associated with managing semi-structured data pipelines and the flattening of hierarchical data.

A challenge in ensuring high data quality when migrating from document databases is in the design and execution of the data migration for semi-structured data in a document database. It is very easy to unintentionally introduce polymorphic data due to a coding mistake in the migration code. If this occurs, it is very difficult to discover the data inaccuracy and will require in-depth data analysis to find data anomalies. Data Pancake can discover any data migration mistakes as it scans and discovers the schema for a data source by identifying any polymorphic data that should not be present. Using the generated dynamic tables, users then locate (via automatic notification of user interface displays) the data that was incorrectly migrated, enabling a development team to locate the programming mistake and correct any necessary code.

Data Pancake allows for the complete configuration of the transformation process from bronze to gold to be completed prior to code generation. Data Pancake enables each polymorphic version of an attribute to be transformed during the flattening process as part of the dynamic table. It also allows for the configuration of additional transformations in the data governance semantic view layer where attribute polymorphic version consolidation can occur, such as combining an int, float, and string into one column, as well as injecting a custom SQL expression to call a UDF or an external function.

The system is configured to validate existing pipelines. For example, users can use Data Pancake today to very quickly and inexpensively (measure by compute) scan and discover the full, complete and consolidated schema for an entire data source to provide validation of your existing semi-structured data pipelines. Data Pancake can provide summary statistics for the schema discovered and allows users to compare outputs to their currently known schemas. Data Pancake is configured to provide users with any one or more or any combination of the following information for each scanned data source: Total # of Attributes; # of Polymorphic Attributes; # of Arrays; # of Objects; # of Attributes that contain stringified JSON; and Max Level of Depth, among other options. If there is a discrepancy between what Data Pancake discovers and what a user's current data pipeline is processing, users can immediately gain access to the schema details and determine the exact differences between the two. If users want to locate the specific data that is missing from their current data pipeline they can generate the dynamic table and view create SQL statements. Once deployed, users can then select data from the deployed dynamic tables and views to locate the specific data in question.

Example Features of Embodiments (e.g., Data Pancake)

Schema Discovery—Scans VARIANT columns in tables, external tables, views, or materialized views to identify every attribute, including nested arrays, polymorphic attributes, and JSON stored as strings. Supported formats include JSON, XML, Parquet, Avro, and ORC; Attribute Metadata Configuration—Configure additional metadata by designating foreign keys for all nested arrays, transformation logic through custom SQL expressions, or row access and column masking policies used to secure access to the generated views and much more; Virtual Attributes—Create virtual attributes with custom SQL expressions that can also be used as foreign keys for nested arrays and included in security policies; SQL Code Generation—Produces optimized SQL to create dynamic tables and secure views, eliminating manual work and future technical debt; Support for Special Characters and Case Sensitivity-Configure data sources to "Use Case Sensitivity" to generate code with attributes aliased with names encapsulated with double quotes to protect case and to support special characters; Schema Drift Management-Automates recurring scans to detect schema changes in new data, generates updated SQL, and sends alerts to keep pipelines reliable and up to date; Security Policy Integration—Integrates row access and column-level masking policies through configuration and code-generated "Create View" SQL statements to enforce data governance; Kafka Support-Support for Kafka topics streamed into Snowflake including: discovery of stringified JSON deduplication logic to limit the output to the most recent message per message key flattened message metadata included in all output dynamic tables and views recurring scans that track the last scanned message timestamp enabling incremental scanning of new data; Native Scalability—Leverages vertical scaling to process data efficiently, regardless of complexity or volume.

The metadata is either generated by the scan (output data type, datetime format, precision, scale) or used to allow the user to provide additional information (the rest of the items in the list) that can be used in the code generation process. The "create virtual attribute" is a feature that allows the user to create a new attribute that does not exist in the original data source with a custom calculation.

As discussed, polymorphic data refers to attributes in a semi-structured document that have different structures or data types. This can occur when documents receive raw data from multiple sources, or changes are made to the underlying schema. It can easily result in queries which miss large portions of raw data or impact downstream features and analytics.

The following example data is considered and examples of various functions discussed to facilitate understanding:

```
address (string)
property_type (string):
{
"_id": "re-8594abcd-3217-4889-ef01-23b45cd6789f",
"property_id": "PR-5689",
```

-continued

```
"property_type": "Mixed-use",
"address": "123 Main St"
}
address (list) object array
property_type (object):
{
"_id": "re-8594efgh-3217-4889-ef01-23b45cd6789f",
"property_id": "PR-5690",
"property_type": {"usage":"Commercial", "sq_ft":20000},
"address": [{
"street": "1234 High Tower Rd",
"city": "Skyline",
"state": "NY",
"zip_code": "10101"
}]
}
```

Schema Discovery Example Considerations

When parsing e.g. semi-structured data, it is difficult to know with certainty that the entire schema has been fully documented or discovered. Schema-less structures can change at any time, and hierarchical data formats have no limit to the depth of nested objects and arrays. The same things which make JSON and XML a desirable storage format also create challenges for organizations hoping to leverage that data for applications, analytics, reporting, and GenAI.

Parsing Semi-Structured Data Example Considerations

SQL provides excellent support for parsing and processing data, but complex semi-structured data can require equally complex queries if users want to unpack, unnest, flatten, and relate the data found in them. That level of data complexity and SQL can be difficult to test and troubleshoot. If the SQL syntax is not accurate the resulting query will generate a null value, and can easily exclude data from your result set if you are not familiar enough with the underlying data to know the value should not be null.

Schema Evolution (or Schema Drift) Example Considerations

The structure or schema of semi-structured data can change easily and often accidentally, making it difficult to track and process the changes coming from upstream data sources. Schema drift can create sudden problems as downstream pipelines are impacted or even broken. This causes delays to reporting, analytics and even product rollouts when features depend on a semi-structured data pipeline. Applications that are built on document databases which use Snowflake as their analytics platform and repository suffer as a result of these uncommunicated and often overlooked schema changes. Worse, if the schema has not changed but data has inadvertently become polymorphic due to data migration errors, these types of adverse impacts can occur without any type of alerting or notification to the appropriate engineering team.

Stringified or Escaped JSON Example Considerations

JSON data can be stored as an escaped string using a string data type. This type of JSON is especially difficult to parse because the schema may be unknown and have its own level of depth and polymorphic state. There is no limit to the level of recursive stringified JSON objects a single string attribute can contain. Unpacking this data can be very time consuming and error prone leading to numerous data quality issues.

Usage Examples

Polymorphic Attributes

This example query identifies attributes in a data source that has more than one data type.

```
select * from
DATAPANCAKE.CORE.VW_DATASOURCE_POLYMORPHIC_ATTRIBUTES
Create Dynamic Table
Preview of Code Generated "Create Dynamic Table"
CREATE OR REPLACE DYNAMIC TABLE
PANCAKE.SAMPLE_DATA.raw_realestate
    TARGET_LAG = '1 hours'
    WAREHOUSE = PANCAKE_X_SMALL_01
    REFRESH_MODE=INCREMENTAL
      AS
      SELECT
         --Select prefix not configured
         CASE WHEN typeof(JSON_DATA:"_id") = 'VARCHAR' THEN
JSON_DATA:"_id"::VARCHAR ELSE NULL END AS "_id_str",
         CASE WHEN typeof(JSON_DATA:"address") = 'ARRAY' THEN
JSON_DATA:"address" ELSE NULL END AS "address_array",
         CASE WHEN typeof(JSON_DATA:"address") = 'VARCHAR' THEN
JSON_DATA:"address"::VARCHAR ELSE NULL END AS "address_str",
    CREATE OR REPLACE DYNAMIC TABLE
PANCAKE.SAMPLE_DATA.raw_realestate_address_obj_arr
    TARGET_LAG = '1 hours'
    WAREHOUSE = PANCAKE_X_SMALL_01
    REFRESH_MODE=INCREMENTAL
      AS
      SELECT
         --Stream metadata not configured
         --Foreign Keys not configured
         CASE WHEN typeof(value:"city") = 'VARCHAR' THEN value:"city"::VARCHAR
ELSE NULL END AS "city_str",
    CREATE OR REPLACE View PANCAKE.SAMPLE_DATA.vw_realestate
    (
    "_id_str",
    "address_array",
    "address_str",
    "amenities_array",
    "custom_root_att" masking policy custom_masking_policy,
    "maintenance_log_array",
    "owner_contact_email_str",
```

```
"owner_contact_name_str",
"owner_contact_phone_str",
"owner_name_str",
"owner_ownerships_percentage_owned_int",
"property_id_str",
"property_management_company_name_str",
"property_management_contact_email_str",
"property_management_contact_name_str",
"property_management_contact_phone_str",
"property_management_notes_array",
"property_management_services_offered_array",
"property_type_sq_ft_int",
"property_type_str",
"property_type_usage_str",
"units_array"
)
ROW ACCESS POLICY realestate_access_policy ON ("custom_root_att")
--Optional parameters not configured
  AS
  SELECT
    "_id_str",
    "address_array",
    verify_address("address_str") as "address_str",
    "amenities_array",
CREATE OR REPLACE View
PANCAKE.SAMPLE_DATA.vw_realestate_address_obj_arr
--Column masking policies not configured
--Row access policy not configured
--Optional parameters not configured
  AS
  SELECT
    --Foreign Keys not configured
    "city_str",
    "jc_custom_att",
    "state_str",
    "street_str",
    "zip_code_str"
  FROM
    PANCAKE.SAMPLE_DATA.raw_realestate_address_obj_arr; Create View
```

Create View SQL statement incorporating row access and column masking policies. Additional transformation using custom UDFs.

Various embodiments are architected to thoroughly analyze a data source containing schema-less, semi-structured JSON data, including its nested hierarchy and the polymorphic state of every attribute. The system identifies and adapts to the data's evolving structure, ensuring the output remains accurate and relevant. The system, integrated with development frameworks, enables seamless operation within the customer's environment, maintaining data integrity and security.

The system can examine a variant column configured to have rows of JSON objects to discover every attribute by recursively traversing the entire object in each row to tackle the intricacies of schema-less, hierarchical data. During this discovery phase, the system is configured to generate detailed metadata for each attribute, accommodating any polymorphism observed in such data.

Users are empowered to configure some of the metadata generated during analysis, including optionally overriding any inferred data type, precision, scale, and datetime format. The system enables user definition of natural foreign keys, for example, for all array attributes, by selecting parent-level attributes displayed in the UI. These natural foreign keys are used in creating relational dynamic tables.

The system recognizes and adapts to the various data types an attribute might embody. It intelligently infers the appropriate output data type for each piece of data, drawing on a sample anonymized value. This process includes discerning a date or datetime data type from a string based on varied ISO standard formats. Embodiments use the generated and user-configured metadata from above to generate SQL statements to establish a series of nested Dynamic Tables. These Dynamic Tables serve as the structured, accessible outcome of what was once a tangled web of nested and polymorphic data. Each polymorphic attribute will be defined in the Dynamic Table as one or more columns based on each data type used by the attribute. Users can then create select statements by joining these dynamic tables at various levels by using the natural foreign key attributes created during the configuration process, enhancing downstream data transformation, interconnectivity, and analysis. The system is configured to generate a consolidated view of the discovered JSON schema and all polymorphic versions of an attribute with their associated data type (e.g., shown in FIG. 32).

Further examples include a monitoring feature. Monitoring ensures that the system remains current with the data it processes. It alerts users to schema modifications in the source data, prompting them to initiate the Dynamic Table SQL generation process. Once generated, the user can deploy the newly updated SQL to update the Dynamic Tables to reflect the latest data structure, maintaining the accuracy and relevance of the transformed data. Some examples include outputs where each attribute can take the shape of any major types of data: e.g., primitives (string, decimal, bool, etc.), arrays (primitive or object), and objects (which can contain additional nested objects or arrays). The system is configured to generate dynamic table create statements with column definitions to support each type of data an individual attribute has ever used. If one attribute takes the shape of four different data types, then one column will be defined for each data type contained in a single attribute. For example, the user sees address_str and address_array_object. This allows data engineers and analysts to begin working with data immediately and clearly understand the shape of the data. Additional transformations are reduced in complexity with these types of column definitions.

According to some embodiments, the sophisticated process to scan involves recursively evaluating every attribute value in all levels for each document or record in the source dataset to determine each attribute's data type usage. datetime formats for string values that can be interpreted as date, time, or datetime, and the largest size of precision and scale used for attributes that store numeric data types.

In further examples, part of the metadata generated is a mapping of the source data type to a destination such as a Snowflake data warehouse. For example, the output data format can have specific data types that the data warehouse supports that are different from the data types supported by JSON to provide an example source. The process is configured to infer the correct destination data type based on the schema and data evaluation. After the metadata has been generated, the user has the flexibility to further configure the metadata prior to code generation to modify the destination data type. As an example, a user may modify the precision and scale by increasing them to something higher than what was discovered in the scanning process based on an understanding that future data can be configured to have numeric values that are bigger than what exists in the data as it is defined currently.

In other embodiments, system and interfaces enable the user to select display options to configure foreign key attributes to be included in flattened arrays, enabling the data to be joined back to parent level entities post transition. In some examples, foreign key attributes are selected by choosing from one of the array's parent entity's attributes. In further embodiments, the code generation process is configured to include these attributes in the flattened array object to allow for the parent entity and the flattened array to be joined relationally using standard SQL. In still other embodiments, the code generation process can be completed without any user configuration, but the system leverages the additional user configurations to optimize code generation. The optimized generation enables the resulting code to be more complete and more functional.

According to one embodiment, the code generation can be processed by a large language model (e.g., LLM) configured to produce code in response to prompts. The prompts are generated based on the configuration information, any attribute information and/or modifications submitted via the UI (e.g., by the user), uploaded existing schema information, data descriptions, etc. In some embodiments, the LLM can be prompted to validate its own source output using the discovered attributes and a row by row validation request provided as an input to the model. The prompts can be optimized by the system according to scan information, attribute discovery, user input, enrichment definitions, foreign key definitions, etc. In further example, the LLM prompts or generation requests include constraints so that each version of each attribute in the requested output code is defined by a common and extensible format (e.g., column name of [attribute_name]_[data_type]). As discussed, identifying each level of each polymorphic data attribute enables the fully defined representation of any source data set. According to various aspects, this allows downstream processes to have the assurance that an output column's data type will not change, as the prior existence and definition of polymorphic data does not change, and new data type information is added to the attribute definition information. Some embodiments include a large language model ("LLM") trained to output executable code in response to a prompt or input. The system is configured to provide details on a data source as part of a prompt to the generation component (e.g., 110) and, for example, an LLM to provide the output deduplication code.

An example attributes table can contain any one or more of the following columns: Path—The name of the attribute inclusive of the entire path within the structure of the data source; Name—The attribute name. Polymorphic Name—The attribute name created by Pancake which appends the data type to the name. Alias—Users can edit this field to create an alias for a given attribute which will be used when the Dynamic Table SQL code is generated as part of the CREATE DYNAMIC TABLE statements. Level—The nested depth of the attribute. Data Type—The inferred attribute data type. Has Embedded JSON—Tickbox used to indicate if the field contains embedded or stringified JSON. Sample Value—For attributes which are columns that contain values, this field will contain a sample of the data. To ensure data security and privacy, columns which contain a string are defaulted to "string value." Array Type—Indicates if the attribute is an object array or a primitive array. Array Prim Data Type—For primitive arrays, indicates the data type. Inferred Data Type—Inferred Data Type, this field is editable so users may change the inferred data type if e.g. they know the source has data they wish to flatten as a VARCHAR rather than a NUMBER, etc. Precision—Inferred precision of numerical data based on Pancake's scan. Users may edit this field if they know the data will contain values with precision or scale outside of the inferred values. Scale—Inferred scale of numerical data based on Pancake's scan. Users may edit this field if they know the data will contain values with precision or scale outside of the inferred values. DateTime Format—Inferred datetime format(s) of an attribute. Users can edit this field if they know a given column has a specific datetime format other than what Pancake has inferred. Null Value Expression-Any valid SQL expression. If this value is not supplied the default value is NULL. Use {attribute_name} as a placeholder in your expression to refer to the polymorphic version of the attribute. This value is not applicable if you have selected SQL Expression as the transformation type. Transformation Type—Type of transformation applied to the Dynamic Table column. Transformation Expression—SQL expression used for the DYNAMIC TABLE column definition if the transformation type equals expression. Use {attribute_name} as a placeholder in your expression to refer to the polymorphic version of the attribute. Foreign Keys—All foreign keys currently set for that array. Date Active—Date the attribute was first discovered or created. Attribute Type—Attributes discovered by Pancake will be defined as "Discovered," custom columns created by users as part of onboarding data using Pancake will be defined as "Virtual."

According to one embodiment, the system is configured to analyze a source data set including polymorphic data. Scanning of the system is tailored to generate a fully defined representation of all the source data including each and all attributes of polymorphic data. In various embodiments, users can interact with this representation to improve and optimize the definition of transformation code and/or an output data format that is relational and fully representative. Many conventional approaches attempt this processing as a fully automated function, and have many shortcomings, including the generation of technical debt (e.g., differences in source and output representations, loss of information, etc.). In some examples, it is the failure of conventional approaches to recognize and provide technical implementation to integrate user based intelligence into the transformations and/or mapping that results in many failures and/or shortcomings. Moreover, some examples demonstrate that it is the timing of the introduction of the user into the process that yields a complete and optimized technical architecture improving over conventional systems. Once a scan of the source data is complete, for example, introducing the user at that time provides the ability and technical implementation for seamless transformation of source data into the complete fully defined format. These user interaction can, for example, enable the data to be joined back to parent level entities post transition (e.g., using standard SQL statements). In some examples, foreign key attributes are selected by choosing from one of the array's parent entity's attributes (an example complex object), which can be done directly in the UI). In further embodiments, the code generation process is configured to include these attributes in the flattened array object to allow for the parent entity and the flattened array to be joined relationally using standard SQL.

Figure 4:
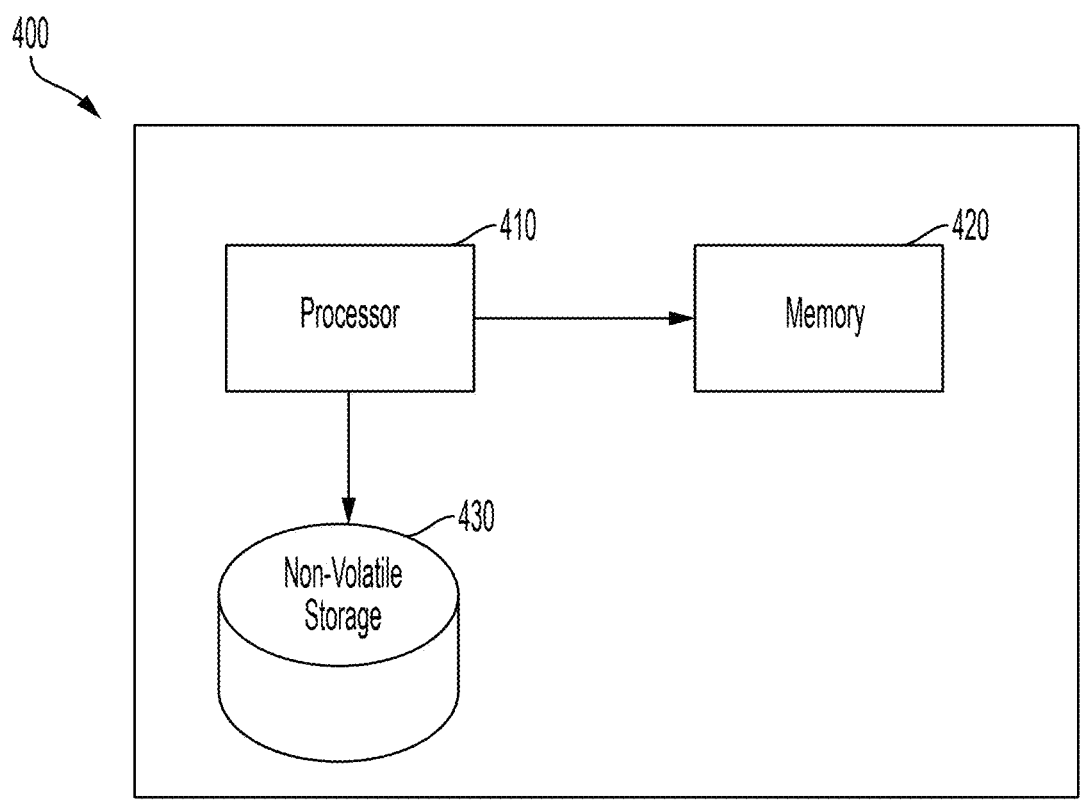
FIG. 4 is a block diagram of an example computer system improved by implementation of the functions, operations, and/or architectures described herein.

Additionally, an illustrative implementation of a special purpose computer system 400, that may be specially programmed to improve over conventional systems, to be used in connection with any of the embodiments of the disclosure provided herein is shown in FIG. 4. The computer system 400 may include one or more processors 410 and one or more articles of manufacture that comprise non-transitory computer-readable storage media (e.g., memory 420 and one or more non-volatile storage media 440). The processor 410 may control writing data to and reading data from the memory 420 and the non-volatile storage device 440 in any suitable manner. To perform any of the functionality described herein (e.g., secure execution, scanning, polymorphic data identification, recursive operations, code generation, user interface display and processing, etc.), the processor 410 may execute one or more processor-executable instructions stored in one or more non-transitory computer-readable storage media (e.g., the memory 420), which may serve as non-transitory computer-readable storage media storing processor-executable instructions for execution by the processor 410.

The terms "program" or "software" or "app" are used herein in a generic sense to refer to any type of computer code or set of processor-executable instructions that can be employed to program a computer or other processor to implement various aspects of embodiments as discussed above. Additionally, it should be appreciated that according to one aspect, one or more computer programs that when executed perform methods of the disclosure provided herein need not reside on a single computer or processor, but may be distributed in a modular fashion among different computers or processors to implement various aspects of the disclosure provided herein.

Other embodiment are configured to allow a chat bot (e.g., LLM, SLM, etc.) backed by artificial intelligence to play a similar role as the user in the transformations and full definition functions. In some examples, the AI model can be provided a prompt to generate foreign keys for polymorphic data attributes after a scan had built a representation of source data. For example, the model can be provided a prompt, requesting it to identify polymorphic data and build a foreign key on an array's parent entity attributes. While this permits some capture of the technical benefit of the user based examples described, a human user in these circumstances has outperformed the bot or agent implementation.

Thus, some examples may use AI models at the post-scan pre-transform stage to capture benefits of the optimization operations, other embodiments require the human user to execute these tasks, and still others may invoke the AI output to provide recommendations to the human user.

NUMBERED EMBODIMENTS

1. A system for generating a fully specified data format, the system comprising: at least one processor operatively connected to a memory, the at least one processor when executing configure to: enable specification of a source data repository, the source data repository including polymorphic data; scan the source data repository to discover a full definition across all source (e.g., hierarchical, semi-structured, schema-less, structured, etc.) data attributes (attributes including lowest level data values, all intermediate, and all highest level data path/specification) having polymorphic attributes, the scan including operations for discovery of metadata for each attribute and each data type ever used for a particular polymorphic attribute executed recursively (e.g., until reaching a lowest level data value for any attribute definition data path or data branch); generate, automatically, transformation code to transform the source data repository and output a fully defined relational table format, having rows defining all instances of all attributes in the source data.

2. A system for generating a fully specified data format, the system comprising: at least one processor operatively connected to a memory, the at least one processor when executing configure to: enable specification of a source data repository, the source data repository including polymorphic data; (optional) display configuration metadata for managing scan parameters to modify scanning of the source data repository; scan the source data repository to discover a full definition across all source (e.g., hierarchical, semi-structured, etc.) data records into a relational table format, having columns defining all instances of all attributes in the source data fully defined; scan the source data repository to discover a full definition across all source (e.g., hierarchical, semi-structured, etc.) data records and produce metadata for each attribute and each data type ever used for a particular attribute; display a configuration profile to modify transformation of the source data repository into a relational table format, having rows defining all instances of all attributes in the source data.

3. A system for generating a fully specified data format, the system comprising: at least one processor operatively connected to a memory, the at least one processor when executing configure to: enable specification of a source data repository, the source data repository including polymorphic data; (optional) display configuration metadata for managing scan parameters to modify scanning of the source data repository; scan the source data repository to discover a full definition across all source (e.g., hierarchical, semi-structured, unstructured, etc.) data attributes (attributes including lowest level data values, all intermediate, and all highest level data path/specification), including discovery of metadata for each attribute and each data type ever used for a particular attribute executed recursively (e.g., until reaching a lowest level data value for any attribute definition data path or data branch); (optional) display a configuration profile to modify transformation of the source data repository into a fully defined relational table format; generate, automatically, transformation code to transform the source data repository and output the fully defined relational table format, having rows defining all instances of all attributes in the source data.
4. The system of any preceding embodiment, wherein the at least one processor is configured to display configuration metadata for managing scan parameters to modify scanning of the source data repository;
5. The system of any preceding embodiment, wherein the at least one processor is configured to display a configuration profile to modify transformation of the source data repository into a fully defined relational table format.
6. The system of any preceding embodiment, wherein the operation to generate automatically the transformation code includes providing the full definition across all source data records as at least part of a declarative statement defining a mapping from at least a part of the source data repository to the fully defined relational table format.
7. The system of any preceding embodiment wherein the generated code is constrained to specify a declaration including a column name of including at least in part attribute name followed by data type.
8. The system of any preceding embodiment, wherein the declaration includes at least part of the information specified in the configuration profile.
9. The system of any preceding embodiment, wherein the information specified in the configuration profile includes at least one of: data type inference information, raw output object information, schema consolidation information, semantic layer information, security policy information, array setting information, or foreign key information.
10 The system of any preceding embodiment, wherein the at least one processor is configured to: display initial scan results having associated metadata to an end user; and accept definition of additional foreign keys (e.g., including complex foreign key creation (e.g., multi-attribute foreign key)) for discovered complex data objects (e.g., nested arrays flattened representation) by the end user.
11. The system of any preceding embodiment, wherein the recursive scan is configured to identify string data types and determine anytime an attribute having the string data type include complex data objects.
12. The system of any preceding embodiment, wherein the recursive scan determines the full definition for data attributes referenced by the complex data objects.
13. The system of any preceding embodiment, wherein the operation to generate automatically the transformation code includes providing the full definition across all source data records as at least part of a prompt to a large language model configured to generate code responsive to input requests.
14. The system of any preceding embodiment, wherein the generated code is constrained to specify a declaration including a column name of including at least in part attribute name followed by data type.
15. The system of any preceding embodiment, wherein at least part of the prompt includes at least part of information specified in the configuration profile.
16. The system of any preceding embodiment, wherein the information specified in the configuration profile includes at least one of data type inference information, raw output object information, schema consolidation information, semantic layer information, security policy information, array setting information, or foreign key information.
17. The system of any preceding embodiment, wherein the at least one processor is configured to: display initial scan results having associated metadata to an end user; and accept definition of additional foreign keys (e.g., including complex foreign key creation (e.g., multi-attribute foreign key)) for discovered complex data objects (e.g., nested arrays flattened representation) by the end user.
18. The system of any preceding embodiment, wherein the recursive scan is configured to identify string data types and determine anytime an attribute having the string data type include stored complex data structures.
19. The system of any preceding embodiment, wherein the recursive scan determines the full definition for data attributes referenced by the stored complex data values.
20. A computer implemented method for executing any of the system numbered embodiments 1-19.

Processor-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in one or more non-transitory computer-readable storage media in any suitable form. For simplicity of illustration, data structures may be shown to have fields that are related through location in the data structure. Such relationships may likewise be achieved by assigning storage for the fields with locations in a non-transitory computer-readable medium that convey relationships between the fields. However, any suitable mechanism may be used to establish relationships among information in fields of a data structure, including through the use of pointers, tags or other mechanisms that establish relationships among data elements.

Also, various inventive concepts may be embodied as one or more processes, of which examples have been provided. The acts performed as part of each process may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, and/or ordinary meanings of the defined terms. As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements.

This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having the same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the techniques described herein in detail, various modifications, and improvements will readily occur to those skilled in the art. Such modifications and improvements are intended to be within the spirit and scope of the disclosure. Accordingly, the foregoing description is by way of example only, and is not intended as limiting. The techniques are limited only as defined by the following claims and the equivalents thereto.

What is claimed:

1. A system for transforming source data and generating a fully specified data format, the system comprising:
   at least one processor operatively connected to a memory, the at least one processor, when executing, configured to:
   enable specification of an existing source data repository, the source data repository including polymorphic data, stored as at least part of a database in the memory of a computer system;
   recursively scan the entire existing source data repository to discover a full schema definition of all attributes within the existing source data repository, including across all source data attributes having polymorphic attributes, the recursive scan including operations for discovery of metadata for each attribute and each data type associated with the attribute recorded, and including creation of the metadata for each attribute and each data type recorded for a particular polymorphic attribute; and
   generate, automatically, transformation code subsequent to discovery configured to transform the existing source data repository into a relational target format specified via the system, the transformation code based on the full schema definition of all the attributes within the existing source data repository, the transformation code when deployed defining a mapping for all instances and data types of all attributes in the existing source data repository and configured to output rows of data in one or more relational data objects.

2. The system of claim 1, wherein the at least one processor is configured to display configuration metadata for managing scan parameters to modify the execution of the recursive scan of the existing source data repository.

3. The system of claim 1, wherein the at least one processor is configured to display a configuration profile to modify transformation of the existing source data repository into a fully defined relational table format.

4. The system of claim 1, wherein the operation to generate automatically the transformation code includes providing the full definition across all source data records as at least part of a declarative statement defining a mapping from at least a part of the existing source data repository to the fully defined relational table format.

5. The system of claim 4, wherein the declaration includes at least part of the information specified in the configuration profile.

6. The system of claim 1, wherein the at least one processor is configured to:
   display initial scan results having associated metadata to an end user; and
   accept definition of additional foreign keys for discovered complex data objects by the end user.

7. The system of claim 1, wherein the recursive scan is configured to identify string data types and determine anytime an attribute having the string data type include complex data objects.

8. The system of claim 7, wherein the recursive scan determines the full definition for data attributes referenced by the complex data objects.

9. The system of claim 1, wherein the existing source data repository includes at least some data in a JavaScript Object Notation (JSON) data format or an Extensible Markup Language (XML) data format.

10. The system of claim 1, wherein the at least one processor is configured to:
    accept user definition of metadata subsequent to discovery to modify the operation of the automatic generation of the transformation code, and
    generate, automatically, the transformation code based on the full schema definition and the metadata.

11. The system of claim 1, wherein the at least one processor is configured to identify and generate metadata for any inactive attributes as part of the full schema definition of the recursive scan.

12. The system of claim 1, wherein the at least one processor is configured to:
    monitor the existing source data repository and identify any updates to data formats in the existing source data repository, and
    responsive to a detected change, update the full schema definition to include each new attribute and each new data type while preserving prior entries of the full schema definition.

13. The system of claim 1, wherein the at least one processor is configured to execute the transformation code to output the target data format from the existing source data repository, the output mapping every attribute and associated metadata for every data type ever used for each attribute contained in the existing source data repository to a corresponding data unit in the target data format.

14. A computer implemented method for transforming source data and generating a fully specified data format, the method comprising:
   enabling, by at least one processor, specification of an existing source data repository, stored as at least part of a database in the memory of a computer system, the existing source data repository including polymorphic data;
   recursively scanning, by at least one processor, the entire existing source data repository to discover a full schema definition of all attributes within the existing source data repository, including across all source data attributes having polymorphic attributes, the recursive scanning including discovery of metadata for each attribute and each data type associated with the attribute recorded for a particular polymorphic attribute; and
   generating, by at least one processor automatically, transformation code subsequent to discovery, configured to transform the existing source data repository into a relational target format specified via the system, the transformation code based on the full schema definition of all the attributes within the existing source data repository, the transformation code when deployed defining a mapping for all instances and data types of all attributes in the existing source data repository and configured to output rows of data in one or more relational data objects.

15. The method of claim 14, wherein the method comprises displaying configuration metadata for managing scan parameters to modify the execution of the recursive scan of the existing source data repository.

16. The method of claim 14, wherein the method comprises displaying a configuration profile to modify transformation of the existing source data repository into a fully defined relational table format.

17. The method of claim 14, wherein the method comprises operation to generate automatically the transformation code includes providing the full definition across all source data records as at least part of a declarative statement defining a mapping from at least a part of the existing source data repository to the fully defined relational table format.

18. The method of claim 17, wherein the method comprises specifying the declaration to include at least part of information specified in the configuration profile.

19. The method of claim 14, wherein the at least one processor is configured to:
   displaying initial scan results having associated metadata to an end user; and
   accepting definition of additional foreign keys for discovered complex data objects by the end user.

20. The method of claim 14, wherein the recursive scan is configured to identify string data types and determine anytime an attribute having the string data type include complex data objects.

21. The method of claim 20, wherein the method comprises determining via the recursive scan the full definition for data attributes referenced by the complex data objects.

* * * * *